United States Patent
Doucet et al.

(10) Patent No.: US 6,348,986 B1
(45) Date of Patent: Feb. 19, 2002

(54) WIRELESS FIBER-COUPLED TELECOMMUNICATION SYSTEMS BASED ON ATMOSPHERIC TRANSMISSION OF LASER SIGNALS

(75) Inventors: Mark A. Doucet; David L. Panak, both of Bryan, TX (US)

(73) Assignee: Dominion Lasercom. Inc., Bryan, TX (US)

(*) Notice: Subject to any disclaimer, the term of this patent is extended or adjusted under 35 U.S.C. 154(b) by 0 days.

(21) Appl. No.: 09/106,826

(22) Filed: Jun. 29, 1998

Related U.S. Application Data

(63) Continuation-in-part of application No. 08/625,725, filed on Mar. 29, 1996, now Pat. No. 5,786,923.

(51) Int. Cl.$^7$ ............................................. H04B 10/00
(52) U.S. Cl. ...................... 359/172; 359/152; 359/173
(58) Field of Search ................................ 359/152, 145, 359/173, 172; 379/56.1, 56.2

(56) References Cited

U.S. PATENT DOCUMENTS

| | | | |
|---|---|---|---|
| 4,090,067 A | 5/1978 | Bell, III et al. | 250/199 |
| 4,358,858 A | 11/1982 | Tamura et al. | 359/152 |
| 4,727,600 A | 2/1988 | Avakian | 359/172 |
| 4,796,301 A | 1/1989 | Uzawa et al. | 359/172 |
| 5,247,381 A | 9/1993 | Olmstead et al. | 359/172 |
| 5,455,672 A | 10/1995 | Lamonde et al. | 356/73.1 |
| 5,493,436 A | 2/1996 | Karasawa et al. | 359/145 |
| 5,818,619 A | * 10/1998 | Medved et al. | 359/172 |
| 5,983,068 A | * 11/1999 | Tomich et al. | 359/118 |
| 6,091,528 A | * 7/2000 | Kanda | 359/159 |
| 6,239,888 B1 | 5/2001 | Willebrand | 359/118 |

FOREIGN PATENT DOCUMENTS

| | | |
|---|---|---|
| JP | 1018326 | 1/1989 |

OTHER PUBLICATIONS

Sladek, "Vier–Strahl–Technik Macht Uebertragung Sicherer," Nachrichten Elektronik und Telematik, vol. 50, No. 8, Aug. 1996, pp. 32–33.

(List continued on next page.)

*Primary Examiner*—Kinfe-Michael Negash
(74) *Attorney, Agent, or Firm*—Conley, Rose & Tayon PC; Jeffrey C. Hood; Mark K. Brightwell

(57) ABSTRACT

A wireless optical transceiver system which includes a passive optical antenna coupled by optical fiber to an active electronics module. The transceiver system receives and transmits light beams from/to the atmosphere,.and thereby communicates optically with a second optical transceiver. Receivers, transmitters, repeaters, switches, routers, etc., may be similarly organized, i.e. by coupling one or more passive optical antennas and an active electronics module with fiber-optic cable. Furthermore, various network topologies and organizations may be arranged using one or more of the fiber-coupled transceivers, receivers, transmitters, repeaters, switches, routers, etc. Such components are admirably suited for use in various network configurations such as broadcast networks, point-to-multipoint networks, etc due to their low cost, ease of installation and antenna sighting, modularity, and upgradability. An optical router for establishing wireless channels to a number of subscribers may be configured based on demodulation and remodulation of light beams, or alternatively by redirecting light beams by adjustable deflections mirrors. A communications network infrastructure based on atmospheric light beam propagation is contemplated.

24 Claims, 22 Drawing Sheets

OTHER PUBLICATIONS

Kube, "Renaissance Eines Alten Konzepts," Nachrichten Elektronik und Telematik, vol. 49, No. 5, May 1995, pp. 15, 16, and 18.

International Search Report, Application No. PCT/US99/14710, mailed Mar. 8, 2000.

AstroTerra Corp, "Additional Services," website: http://www.photon.com/matsueda/Ast.../Additional%20Services/addserv.htm, 1996, 2 pages.

AstroTerra Corp, "Product Information, TerraLink 1000™Series," website: http://www.photon.com/matsueda/Ast...a/Product%20Info/T_1000/t_10000.htm, 1996, 2 pages.

AstroTerra Corp, "Product FAQ, Frequently Asked Questions," website: http://www.photon.com/matsueda/AstroTerra/FAQ/faq.htm, 1996, 5 pages.

* cited by examiner

WIRELESS FIBER-COUPLED TELECOMMUNICATION SYSTEMS BASED ON ATMOSPHERIC TRANSMISSION OF LASER SIGNALS

CONTINUATION DATA

This application is a continuation-in-part of U.S. patent application Ser. No. 08/625,725 entitled "Point-to-Multipoint Wide Area Telecommunications Network via Atmospheric Laser Transmission Through a Remote Optical Router", filed on Mar. 29, 1996 now U.S. Pat. No. 5,786,923, invented by Mark A. :Woucet and David L. Panak, and assigned to Dominion Communications, LLC.

FIELD OF THE INVENTION

The present invention relates generally to wireless telecommunications networks, and more particularly to a broadband telecommunication system and network which employs atmospheric (i.e. free-space) laser transmission.

DESCRIPTION OF THE RELATED ART

In the modern telecommunications market, there exists a vast array of products and services targeted for the needs and desires of consumers at every level. Many of these products and services necessitate a network infrastructure. For example, telephone service is mediated by the Public Switched Telephone Network (PSTN), also known as the Plain Old Telephone System (POTS).

Any-to-any connectivity is a fundamental organizing principle of the PSTN, i.e. any telephone subscriber should be able to call and communicate with any other telephone subscriber. The switching systems employed in the PSTN are almost completely digital. Fiber optic cables, copper cables, microwave links, and satellite links are used for data transmission. Transmission over the local loop is typically carried by copper-based T1 feeder or fiber optic cable. However the subscriber loop is still primarily implemented with copper UTP (unshielded twisted pair). Thus, the transmission bandwidth deliverable to a telephone subscriber is severely limited, typically less than 56,600 bits per second. At present, the PSTN bears the triple burden of conveying voice, fax, and data communications, and is nearly saturated in certain large metropolitan regions.

The Integrated Services Digital Network (ISDN) represents a step upward in speed relative to the PSTN. First time subscribers to ISDN service generally incur a cost for installation of an ISDN line which comprises upgraded copper wire. Computer users who access a corporate Intranet or the Internet through an ISDN line and ISDN modem experience increased performance relative to connecting through the PSTN.

A variety of communication applications such as interactive television, video telephony, video conferencing, video messaging, video on demand, high definition television (HDTV) and high-speed data services require broadband data transmission. In fact, many communication applications may require bandwidths high enough to exclude ISDN as a feasible medium for establishing a data connection.

Optical fiber offers significantly higher data transmission bandwidths than copper wire/media. However, fiber optic networks such as fiber to the curb (FTTC) and fiber to the home (FTTH) require new fiber optic cable to be run to every subscriber. Thus, the cost of implementing a fiber optic network may be exorbitant. Other alternatives for increasing the capacity of existing networks include Asymmetric Digital Subscriber Line (ADSL), Symmetric Digital Subscriber Line (SDSL), and Hybrid Fiber Coax (HFC), among others.

In general, all hard-wired networks are burdened with the requirement of laying cable to new subscribers/nodes. Furthermore, it is difficult to reconfigure the topology of an existing hard-wired network since cables are quite often buried underground, suspended from poles, or stung through the interstitial spaces of office buildings.

In contrast, wireless networks based on the radiation of electromagnetic energy through free space (i.e. the atmosphere) are able to service subscribers without incurring costs for laying cable to the subscribers. Many wireless telecommunication systems are organized as broadcast systems where a single transmitter sends an information signal to multiple receivers. For example, the Direct Broadcast Satellite (DBS) systems such as PrimeStar, Digital Satellite Service, etc. provide satellite broadcast of video channels to subscribers equipped with a receiving antenna (typically a dish antenna) and a set-top decoder. Wireless telecommunication systems and networks are widespread and numerous. Their numbers continues to increase in response to consumer demand. Thus, the radio spectrum is increasingly crowded resulting in degraded signal quality and/or increased subscriber costs.

In certain circumstances and for various reasons, a client/customer may desire point-to-point communication, i.e. the transmission of information between two points separated by a distance. For example, a microwave link between two central offices in the PSTN may be a point-to-point connection. Laser technology provides an admirable alternative to radio transmission for establishing broadband point-to-point communication due to the fact that lasers inherently generate narrowly focussed beams. Laser-based wireless systems have been developed for establishing point-to-point, bi-directional and high speed communication through the atmosphere. The range for such systems is typically 0.5 to 1.2 miles, with some systems achieving a range of 4 miles or more. The longest atmospheric communication path achieved with a point-to-point system exceeded 100 miles.

These point-to-point systems require a laser-based communication unit at each end of the point-to-point connection. A laser-based communication unit includes an optics package, a laser transmitter, an optical receiver, and a data interface package. The laser transmitter includes a laser for generating a laser beam, and modulating electronics for impressing a first information signal onto the laser beam. Quite often, the first information signal is a digital signal and ON/OFF keying is employed as the modulation scheme. The modulated laser beam is transmitted into the atmosphere by the optics package. Thus, the optics package is sometimes referred to as an optical antenna. The optics package also receives a second laser signal from the atmosphere, and provides the second laser signal to the optical receiver. The optical receiver includes photo-detection and demodulation electronics for recovering a second information signal from the second laser signal.

The data interface package is coupled to the laser transmitter, the optical receiver and to a communication bus. The data interface package is configured to send and receive data on the communication bus according to a pre-defined communication protocol. The data interface receives the first information signal from the communication bus and transmits the first information signal to the laser transmitter for modulation. The data interface also receives the second information signal from the optical receiver and transmits the second information signal onto the communication bus. Typically, a computer of some sort generates the first information signal and receives the second information signal. Thus, the computer generally requires a separate interface card/package in order to send/receive signals over the communication bus. For example, the communication bus may be the well-known Ethernet bus. In this case, the data interface in the laser-based communication unit is Ethernet compatible as is the interface card/package coupled to the computer.

In prior art laser-based point-to-point systems, the subsystems of the laser-based communication unit, i.e. the optics package, the laser transmiitter, the optical receiver, and the data interface package, are physically integrated into a common chassis. As will become apparent in the following discussion, the binding of all the sub-systems into a commnon chassis effects the design complexity of the communication unit and the installation procedures for the communication unit both of which impact the effective cost to the consumer.

In order to establish a point-to-point connection, two laser-based communication units must be configured so that their respective optical antennas achieve a line of sight (LOS) through the atmosphere. This generally requires that the units be installed at an elevated outdoor location such as a rooftop. Since, the communication unit includes active electronics, the user/client generally incurs a significant cost for providing a power connection to the installation site. This cost severely impacts the marketability of existing laser-based systems to home users and small business users.

The communication unit, being situated out of doors, may be exposed to a wide variation of temperature and weather conditions. Thus, the communication unit may require heating and/or cooling devices in order to protect the electronic subsystems. Furthermore, the chassis must generally be weatherproof. For example, the chassis should be designed to withstand rain, wind, and perhaps hail disturbances. Humidity from the ambient air may corrode internal metallic parts. These weather related constraints add to the overall cost of prior art laser-based communication units.

Laser-based communication units are massive and voluminous because of the colocation of transceiver electronics, data interface, and antenna optics in a common chassis. Care must be exercised to securely mount the chassis onto a supporting substrate. For example, the chassis often includes a base plate with holes which admit mounting screws. The cost of designing the chassis and its mounting structures contributes to overall cost of the communication unit.

After the communication unit has been mounted, an installer/user must adjust the angular orientation of the unit to achieve an optical line of sight (LOS) to a remote communication unit. The optical antenna of the local unit must be pointed at the optical antenna of the remote unit, and vice versa. This adjustment generally requires coordination between two installation personnel, one located at each site. In order to facilitate the LOS adjustment process, communication units typically include an external sighting scope. An installer/user looks through the sighting scope to determine the current direction of the optical antenna. The sighting scope is typically bore-sighted (i.e. calibrated) at the manufacturing facility. The installer/user adjusts the orientation of the communication unit until the remote antenna is centered in the cross-hairs of the sighting scope.

Since the bore-sighting (calibration) of the sighting scope may be comprised by physical disturbances to the sighting scope and/or communication unit, the laser beam transmitted by the optical antenna may not intercept the remote optical antenna when the unit is adjusted only on the basis of the sighting scope. The installer/user may have to execute a search procedure to achieve beam contact with the remote optical antenna. In other words, the installer/user may have to randomly adjust the orientation of the local unit while obtaining feedback from the person at the remote unit to determine when LOS has been achieved. The additional time required to conduct the random search in case of an insufficiently bore-sighted sighting scope significantly adds to the cost of installation.

Although a sighting scope may be bore sighted initially, e.g. in the factory or by trained personnel at a field site, the bore sighting (i.e. calibration) may be compromised over the passage of time. For example, thermal stresses and weathering (rain, hail, wind, etc.) may contribute to loss of bore sighting accuracy. Thus, the cost of bore sighting may be incurred more than once through the lifetime of the laser-based communication unit.

On occasion, the installer/user may desire to replace or upgrade one or more of the electronic subsystems of the communication unit. Since the electronic and optical subsystems of the communication unit are combined in a common housing, the process of the accessing the electronic components/subsystems generally implies a physical disturbance of the optical antenna and the line of sight to the remote optical antenna. For example, replacement or upgrade of the data interface board may require the removal of an access panel. The pressures exerted in removing the access panel and exchanging boards may disturb the LOS of the communication unit. In some situations, the communication unit must be dismounted and transported to a repair facility for testing and repair. Thus, the investment in achieving LOS to the remote optical antenna may be lost when accessing electronics for maintenance, repair, and/or upgrade.

After accessing the electronics in the communication unit, the communication unit must generally be re-sighted at additional cost to the user/client. As with the initial sighting, the re-sighting generally requires two personnel: one situated at the local site to perform angular adjustments, and another situated at the remote site to confirm when LOS has been achieved. Thus, modification to the electronics of one communication unit generally requires two personnel to coordinate the LOS adjustment. This greatly increases the effective cost of repairing or modifying the electronics of the communication unit.

Laser-based systems are capable of maintaining a high-bandwidth point-to-point connection in some of the most severe inclement weather conditions. However, the cost of such systems is typically in the $10,000 to $20,000 dollar range, making them unsuitable for most home and business use.

Therefore, a need exists for a laser-based communication system which may be mounted more simply and efficiently than in prior art systems. Furthermore, a laser-based communication system which allows for accurate and efficient attainment of LOS to a remote unit is desired. Any method for circumventing the necessity of re-sighting the communication system upon repair or upgrade of electronics is greatly to be desired. Any method for simplifying user access to the electronic subsystems of the laser-based communication system is desirable. In general, a considerable need exists for a laser-based communication system which realizes significant cost reductions with respect to prior art systems.

Furthermore, in view of the problems associated with wired networks and radio-transmission based networks, a wireless laser-based telecommunication system is desired which provides a number of subscribers with high-bandwidth telecommunication services. In particular, a wireless laser-based telecommunication system is desired that enables a number of subscribers to communicate with a great number of subscribers. A wireless laser-based telecommunications system is further desired which reduces the cost to each subscriber, yet maintains high-speed, bi-directional, broadband, wide area telecommunications. A system is desired which does not require the huge installation costs of ISDN and fiber optics, and which does not require any of the electromagnetic broadcast bands in the radio spectrum. Such a network could be employed in a wide variety of applications such as telephony, data communications such as the Internet, teleconferencing, radio broadcast, and various television applications such as cable television, HDTV and interactive TV.

SUMMARY OF THE INVENTION

The present invention comprises a wireless optical transceiver system which includes a passive optical antenna coupled by optical fiber to an active electronics module. The transceiver system receives and transmits light beams from/to the atmosphere, and thereby communicates optically with a second optical transceiver. The fiber-optic isolation between an active electronics module and passive optical antenna has a host of implications which reduce the initial system cost and ongoing maintenance costs to the user. In particular, the passive optical antenna, free from the encumbering influence of active system components, may be installed more easily and efficiently. Line of sight to a target antenna may be achieved by disconnecting the optical fiber and visually observing through the optical path of the passive antenna. Furthermore, the isolation implies that a power connection is not longer required at the site of the optical antenna. This results in significant saving to the user/client.

In addition to an optical transceiver system, the present invention also contemplates receivers, transmitters, repeaters, switches, routers, etc. configured according to the principle of fiber-optic isolation between a passive optical antennas and active electronics modules. Such components are admirably suited for use in various network configurations such as broadcast networks, point-to-multipoint networks, etc due to their low cost, ease of installation and antenna sighting, modularity, and upgradability.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PRESENT INVENTION

Incorporation by Reference

For general information on broadband telecommunications and optical data communications, please see Lee, Kang and Lee, *Broadband Telecommunications Technology*, Artech House, 1993 which is hereby incorporated by reference in its entirety. Also please see Davis, Carome, Weik, Ezekiel, and Einzig, *Fiber Optic Sensor Technology Handbook*, Optical Technologies Incorporated, 1982, 1986, Herndon, Va., which is hereby incorporated by reference in its entirety.

Full-Duplex Transceiver System

Figure 1:
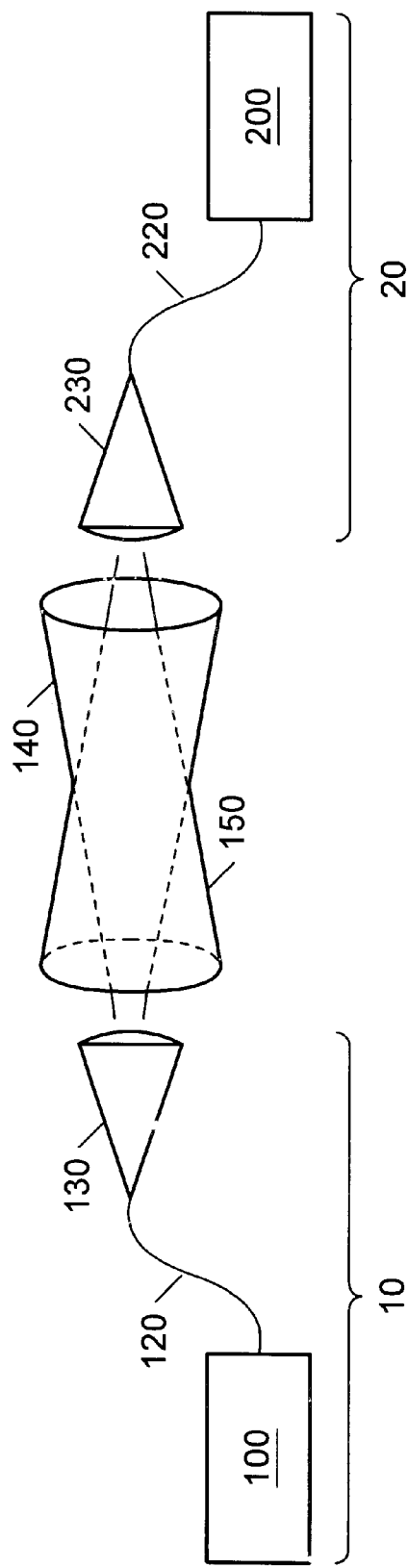
FIG. 1 illustrates a full-duplex transceiver system according to the present invention in communication with a second transceiver system.

Referring now to FIGS. 1, a full-duplex transceiver system 10 for light-based wireless communication through the atmosphere is presented. Transceiver 10 includes transceiver electronics module 100 and passive optical antenna 130. The transceiver electronics module 100 is coupled to passive optical antenna 130 through optical fiber 120. Since the optical antenna 130 includes only passive components, no power connection is necessary at the location of optical antenna 130. The user of transceiver system 10 thereby avoids the cost of installing power at site of the optical antenna 130. Since optical antennas are generally situated at elevated outdoor locations such as rooftops, this cost savings is typically significant.

Since passive optical antenna 130 is coupled to the transceiver electronics module 100 by optical fiber, the transceiver electronics module may be separated from the passive optical antenna 130 by a significant distance. Transceiver electronics module 130 may thereby easily be situated near an existing power outlet. Typically, this implies that the transceiver electronics module will be located indoors. Thus, the transceiver electronics module 100 will not generally require protection from weathering and extreme temperature variation. Cost reductions connected with these simplifications may be passed to the consumer.

Furthermore, the fiber optical coupling between the transceiver electronics module and the passive optical antenna implies that the former may be modified or upgraded without disturbance to the passive optical antenna. To upgrade the transceiver electronics module, the user may disconnect the optical fiber, exchange the transceiver electronics module 100 with an upgraded version, and reconnect the optical fiber to the new module. The fiber optic coupling implies that the passive optical antenna will experience no physical disturbance due to the upgrade. Similar remarks may be made in situations where the transceiver electronics module 100 is subjected to repair or maintenance. Thus, the initial investment in achieving a line of sight between passive optical antenna 130 and optical antenna 230 may be advantageously preserved.

Since the active optical and electronic components are separated from the passive optical antenna, both subsystems (i.e. the transceiver electronics module and the passive optical antenna) are simplified and may be more compactly arranged. Increased modularization leads to decreased manufacturing costs.

Passive optical antenna 130 decouples a first light beam from optical fiber 120 and transmits the first light beam into the atmosphere. Transmitted light beam 140 propagates through space to optical transceiver 20. In one embodiment shown in FIG. 1, optical transceiver 20 is similar to transceiver system 10, thus enabling bi-directional point-to-point communication between the two transceiver systems. Thus, optical transceiver 20 includes passive optical antenna 230 coupled to transceiver electronics module 200 through optical fiber 220.

In addition to beam transmission, optical antenna 130 receives a second light beam 150 from the atmosphere and couples the second light beam onto optical fiber 120. The second light beam is transmitted by optical transceiver 20.

Figure 2:
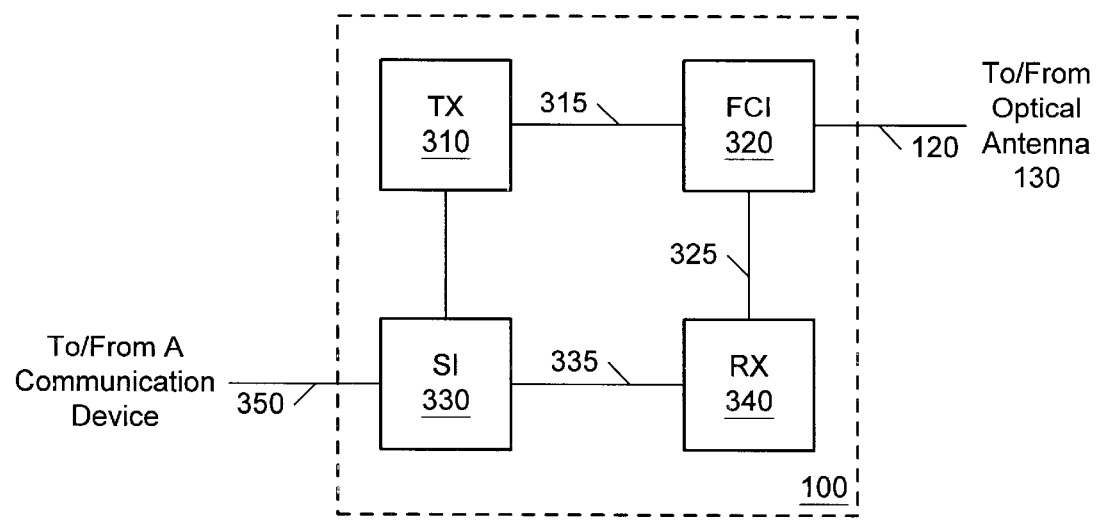
FIG. 2 illustrates the transceiver electronics module of the full-duplex transceiver system of FIG. 1 according to the present invention.

Referring now to FIG. 2, a block diagram of transceiver electronics module 100 is shown. Transceiver electronics module 100 includes transmitter 310, fiber coupling interface 320, signal interface 330, and receiver 340. It is noted FIG. 2 indicates a pattern of interconnectivity and not necessarily the spatial layout or physical dimensions of the depicted subsystems. Transmitter 310 generates the first light beam and modulates the first light beam according to a first information signal. Thus, transmitter 310 includes a light source such as a semiconductor laser. In one embodiment of transmitter 310, the first light beam is modulated after it is emitted from the light source. In a second embodiment, modulation is performed by controlling the voltage or current supplied to the light source. Transmitter 310 receives the first information signal from signal interface 330. After modulation, first light beam 315 is supplied to fiber coupling interface 320. The fiber coupling interface 320 couples the first light beam onto optical fiber 120. Fiber coupling interface 320 preferably includes a connector to facilitation the connection of optical fiber 120.

Fiber coupling interface 320 also decouples the second light beam from optical fiber 120, and supplies the decoupled second light beam 325 to receiver 340. Receiver 340 demodulates the second light beam to recover a second information signal. The second information signal is supplied to signal interface 330. Receiver 340 includes a photodetection circuit to detect the second light beam and convert the second light beam into an analog electrical signal. In addition, receiver 340 preferably includes demodulation circuitry for recovering the second information signal from the analog electrical signal.

Signal interface 330 is configured to couple to a communication bus 350. Signal interface 330 receives the first information signal from communication bus 350 and transmits the first information signal to transmitter 310. In addition, signal interface 330 receives the second information signal from receiver 340 and transmits the second information signal onto communication bus 350.

In the preferred embodiment of transceiver electronics module 100, signal interface 330 is a digital data interface and communication bus 350 is a digital data bus. Thus, when referring to this embodiment, signal interface 330 will hereinafter be referred to as data interface 330, and communication bus 350 will be referred to as data bus 350. Data interface 330 is preferably configured for Ethernet compatibility, in which case data bus 350 is an Ethernet-compatible bus. However, it is noted that any type of data interconnection bus may be used to realize data bus 350.

In one embodiment of transceiver electronics module 100, transceiver electronics module 100 is configured as a PC card (or board) for insertion into a computer slot. In this case data interface 330 is configured for exchanging data according to the protocol prevailing on the system bus of the host computer into which it is to be inserted. The host computer provides the first information signal (i.e. a first data stream) to the transceivers electronics module and likewise receives the second information signal (i.e. a second data stream) through its system bus. Thus, the host computer advantageously avoids the need for a specialized communication interface such as an Ethernet card for communicating with the transmission system 10.

Recall that prior art optical transceivers are generally integrated with the antenna optics. Thus, prior art transceivers are typically located remotely. To facilitate data exchange with a computer or digital device(s), prior art transceivers typically include a bus interface such as an Ethernet interface. In order to communication with such a prior art transceiver, a computer would typically require a second bus interface compatible with the bus interface of the transceiver. The PC card embodiment of transceiver electronics module 100 advantageously simplifies the communication path to the host computer. The host computer may communicate with the optical transceiver 10 without employing an external communication bus. Transceiver electronics module 100 may be configured to support any of a variety of telecommunication applications such a real-time video, Internet access, etc. Thus, high-bandwidth full-duplex wireless communication may be provided to a computer user at significantly reduced cost.

Transceiver 10 supports full-duplex communication with optical transceiver 20 mediated by atmospheric transmission of the first and second light beams. In the preferred embodiment of transceiver system 10, the first light beam and the second light beam have distinct wavelengths, and fiber coupling interface includes a wavelength separation device such as a dichroic mirror for separating the transmit and receive paths. Transmitter 310 continuously generates and modulates the first light beam, while receiver 340 continuously detects and demodulates the second light beam. Similarly, passive optical antenna 130 continuously transmits the first light beam 140 into the atmosphere, and continuously receives the second light beam 150 from the atmosphere. In this embodiment employing distinct transmit and receive wavelengths, transceiver system 10 and optical transceiver 20 are complementary. Namely, the transmit wavelength of transceiver system 10 is equal to the receive wavelength of optical transceiver 20, and the receive wavelength of transceiver system 10 is equal to the transmit wavelength of optical transceiver 20.

In another embodiment of transceiver system 10 and optical transceiver 20, the first light beam and second light beam have different polarization, and polarization serves as the means for separating the transmit and receive paths in the fiber coupling interface 320.

Passive optical antenna 130 is aligned on a line of sight (LOS) with optical antenna 230 of optical transceiver 20. Passive optical antenna 130 preferably uses a single-lens system to couple the light beams into and out of optical fiber 120. Since the passive optical antenna is isolated from active electronics by a fiber coupling, the passive optical antenna may be configured as a light and compact package which contributes to the ease of installation and in particular to the ease of achieving LOS to the optical antenna 230. Furthermore, since the optical fiber may be easily disconnected from the passive optical antenna 130, a user/installer may position his/her eye directly in the light transmission path of passive optical antenna 130. Thus, the user/installer may advantageously performs angular adjustments while physically viewing through the true optical path of passive optical antenna 130. When the target, i.e. optical antenna 230 is visually centered in the fiber aperture, a line of sight is achieved. This ability to directly view the optical path of optical antenna 130 eliminates the need for a separate sighting scope, and the attendant need for bore sighting (i.e. calibrating) the sighting scope. Thus, the cost of the transceiver system 10 may be advantageously reduced. Once the line of sight to the target antenna has been achieved, the optical fiber 120 may be reconnected to passive optical antenna 130, and system operation may commence. Since LOS is achieved with less complexity and more reliably, the cost of installation is significantly reduced.

Furthermore, since modifications to transceiver electronics module 100 do not disturb passive optical antenna 130, the installation/alignment process may be performed less frequently as compared to prior art systems which co-located electronics and antenna optics. Thus, the user of transceiver system 100 may experience lower on-going costs to maintain the communication link with optical transceiver 20.

The isolation of active components and passive optical antenna into separate modules allows the user-client to independently choose the electronics module and the passive optics module. Each may occur in a variety of models and configurations to suit various user requirements.

Since the optical fiber is low loss medium, a significant distance may prevail between the passive optical antenna and transceiver electronics unit without significant loss of signal power. The transceiver electronics unit may therefore be situated at any location convenient to the user-client and with access to a power connection. For example, the transceiver electronics module 100 may occur as a stand alone package. The stand alone package may couple to an existing network infrastructure such as the ISDN, PSTN, or the Internet.

The passive optical antenna 130 is lighter and more compact than in prior art systems since it is separated from active components. Thus, it is easier to achieve a secure mounting of the passive optical antenna. In practice, smaller mounting screws may be used to fix the optical antenna to a substrate/foundation.

The isolation between transceiver electronics modules and passive antennas allows a system administrator is reconfigure the connectivity between multiple transceiver modules and multiple antennas. The isolation principle leads to increased system flexibility and maintainability.

Hereafter, a number of embodiment of receiver, transmitter, transceivers, repeaters, switches, routers, etc. are presented. In every case, the principle of fiber optic isolated between a compact and light passive optical antenna, and an active optoelectronic module may be employed to capitalize on the advantages described in connection with optical transceiver system 10.

Half-Duplex Transceiver System

It is noted that a half-duplex transceiver system (not depicted) may be configured similar to full-duplex transceiver 10 according to the principle of separating active electronics subsystems from the passive optical antenna by a fiber optic coupling. The half-duplex system partakes of the same advantages as the full-duplex transceiver system with regard to ease of installation and line of sight targeting, efficiency of manufacture and upgrade, and reduction of initial and ongoing support costs.

Optical Transmitter

Figure 3A:
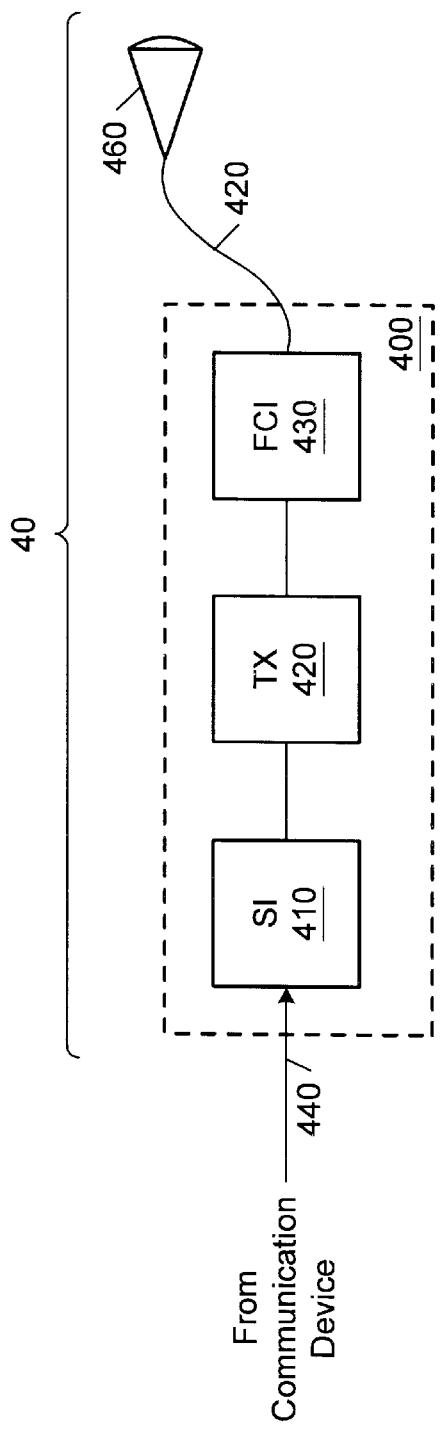
FIG. 3A illustrates an optical transmission system according to the present invention.

Referring now to FIG. 3A, a transmitter system 40 for wireless transmission of information based on light-beam propagation through the atmosphere is presented. Transmission system 40 includes transmitter electronics module 400 and passive optical antenna 460 coupled via optical fiber 420. Transmission electronics module 400 includes signal interface 410, transmitter 420, and fiber coupling interface 430. Signal interface 410 is configured to couple to communication bus 440. Signal interface 410 preferably includes a specialized connector for coupling to communication bus 440. Signal interface 410 receive a first information signal from communication bus 440 and transmits the first information signal to transmitter 420. Transmitter 420 generates a first light beam and modulates the first light beam according to the first information signal. Thus, transmitter 420 includes a light source such as a laser diode. Transmitter 420 supplies the modulated first light beam to fiber coupling interface 430. Fiber coupling interface 430 couples the first light beam onto optical fiber 420. Passive optical antenna 430 decouples the first light beam from optical fiber 420 and transmits the first light beam into the atmosphere.

The communication bus 440 couples to a communication device (not shown) which serves as a source for the first information signal.

Passive optical antenna 460 is aligned to transmit the first light beam to one or more optical receivers (not shown).

Optical Receiver System

Figure 3B:
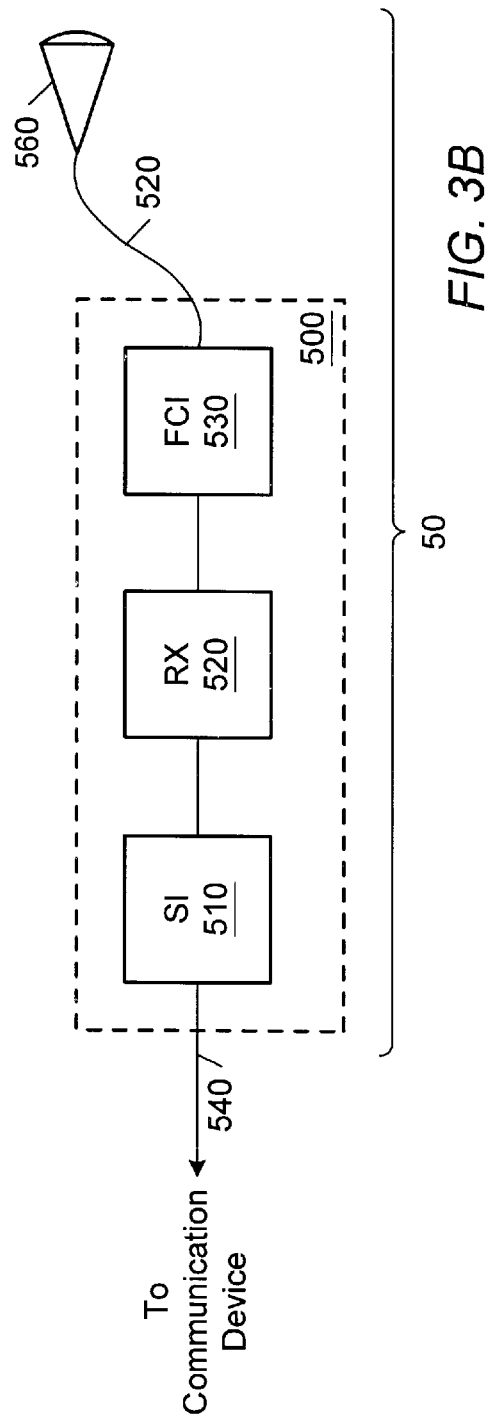
FIG. 3B illustrates an optical receiver system according to the present invention.

Referring now to FIG. 3B, a receiving system 40 for receiving light-beam transmissions is depicted. The receiving system 40 includes a receiver electronics module 500 and passive optical antenna 560 coupled via optical fiber 520. Passive optical antenna 560 receives a first light beam from the atmosphere, and couples the first light beam onto optical fiber 520. Optical fiber 520 provides the first light beam to receiver electronics module 500.

Receiver electronics module 500 includes signal interface 510, receiver 520, and fiber coupling interface 530. Fiber coupling interface 530 decouples the first light beam from optical fiber 520, and provides the first light beam to receiver 520. Receiver 520 demodulates the first light beam to recover a first information signal which is carried on the first light beam. Thus, receiver 520 includes photodetection circuitry to convert the first light beam into an electrical signal. Receiver 520 further includes demodulation circuitry to demodulate the first information signal from the electrical signal. The first information signal is supplied to signal interface 510.

Signal interface 510 is configured to coupled to communication bus 540. Signal interface 510 receives the first information signal from receiver 520 and transmits the first information signal onto communication bus 540. Communication bus 540 couples to a communication device which serves as a sink for the first information signal.

Dual Simplex Transceiver System

Figure 4:
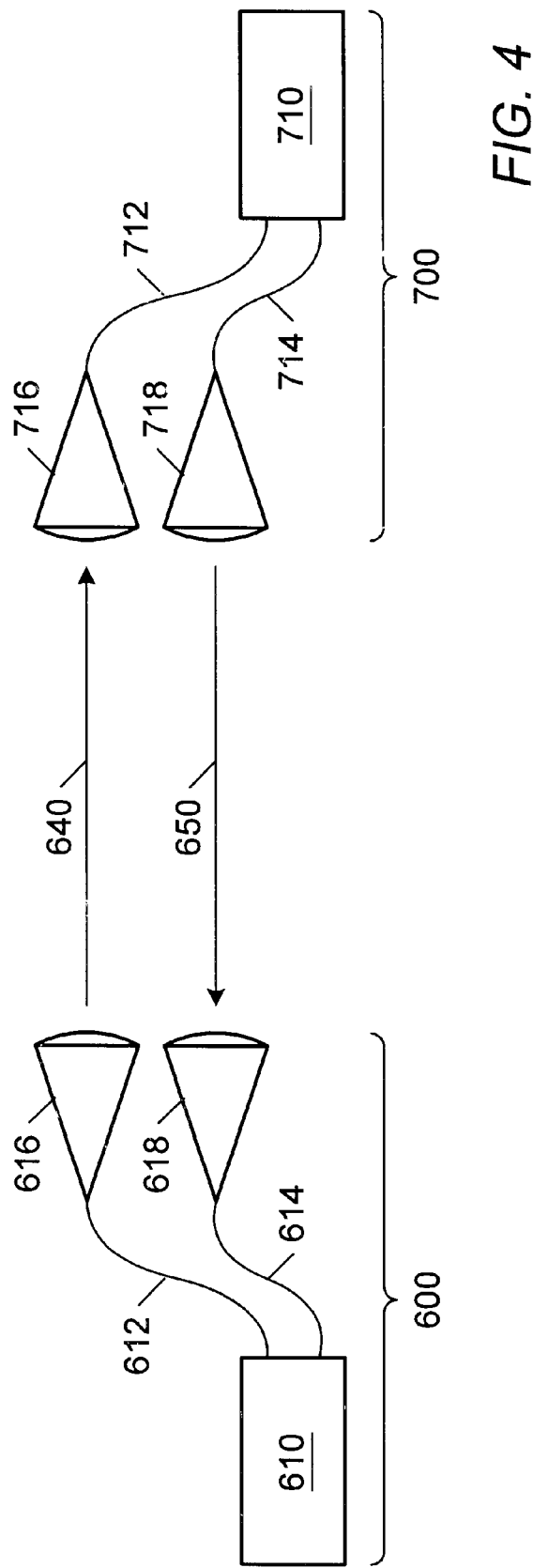
FIG. 4 illustrates a dual-simplex optical transceiver system according to the present invention.

Referring now to FIG. 4, a dual-simplex transceiver system 600 is shown. Dual-simplex transceiver system 600 includes transceiver electronics module 610, passive transmit optical antenna 616, passive receive optical antenna 618. Transmit optical antenna 616 is coupled to transceiver electronics module 610 through optical fiber 612. Receive optical antenna 618 is coupled to transceiver electronics module 610 through optical fiber 614.

Transmit optical antenna 616 decouples a first light beam from optical fiber 612 and transmits the first light beam into the atmosphere. The first light beam 640 propagates through space to optical transceiver system 700. In the embodiment shown in FIG. 4, optical transceiver system 700 is similar to dual-simplex transceiver system 600. Thus, optical transceiver system 700 includes transceiver electronics module 710, passive receive optical antenna 716, and passive transmit optical antenna 718. Receive optical antenna 716 is coupled to transceiver electronics module 710 through optical fiber 712. Transmit optical antenna 718 is coupled to transceiver electronics module 710 through optical fiber 714.

Figure 5:
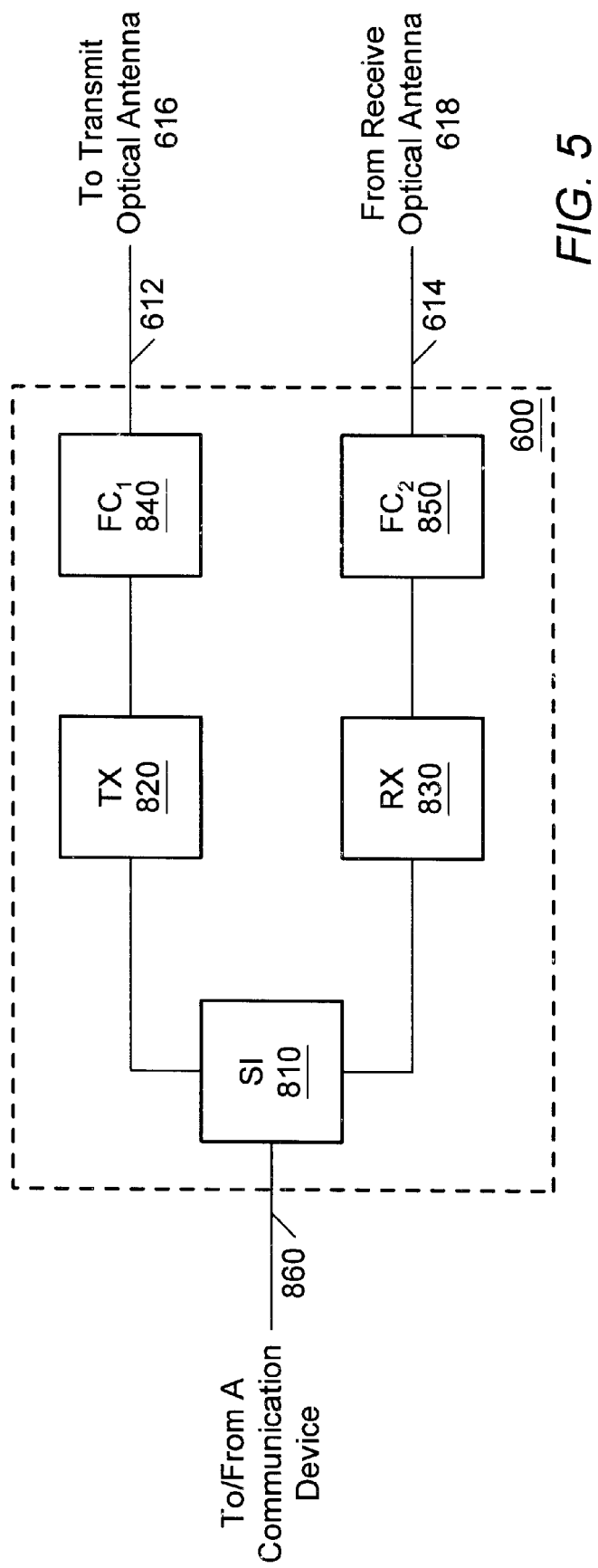
FIG. 5 illustrates the transceiver electronics module of the dual-simplex transceiver system of FIG. 4 according to the present invention.

Referring now to FIG. 5, a block diagram of transceiver electronics module 600 is shown. Transceiver electronics module 600 includes signal interface 810, transmitter 820, receiver 830, fiber coupler 840 and fiber coupler 850. Signal interface 810 is con-figured to couple to a communication bus 860. Signal interface 810 receives a first information signal from communication bus 860, and provides the first information signal to transmitter 820. Transmitter 820 generates the first light beam and modulates the first light beam according to the first information signal. Transmitter 820 provides the modulated first light beam to the fiber coupler 840. Fiber coupler 840 couples the first light beam onto optical fiber 612. The first light beam propagates the length of optical fiber 612 and is transmitted into space by transmit optical antenna 616.

Fiber coupler 850 decouples the second light beam from optical fiber 614, and provides the second light beam to receiver 830. Receiver 830 detects and demodulates the second light beam, and thereby recovers a second information signal. The second information signal is provided to signal interface 810. Signal interface 810 transmits the second information signal onto communication bus 860.

Transmit optical antenna 616 and receive optical antenna 716 are aligned to achieve an optical line of sight (LOS). Thus, the first light beam effectively illuminates receiver optical antenna 716. Also, transmit optical antenna 718 and receive optical antenna 618 are aligned to achieve a line of sight. Thus, the second light beam effectively illuminates the receiver optical antenna 618.

In one embodiment, dual-simplex transceiver system 600 is configured for communication compatibility with full-duplex transceiver system 10 of FIG. 1. Thus, the wavelength of the first light beam generated by the dual-simplex transceiver system 600 is equal to the receive wavelength of the full-duplex transceiver system 10. Also, the dual-simplex transceiver system 600 is configured to receive the second light beam at a wavelength equal to the transmit wavelength of full-duplex transceiver 10. In this embodiment, both antennas of the dual-simplex transceiver system 600 are aligned to achieve a line of sight to passive optical antenna 130 of full-duplex transceiver 10.

Receiver System with Antenna Array for Increasing Received Signal Power

Figure 6A:
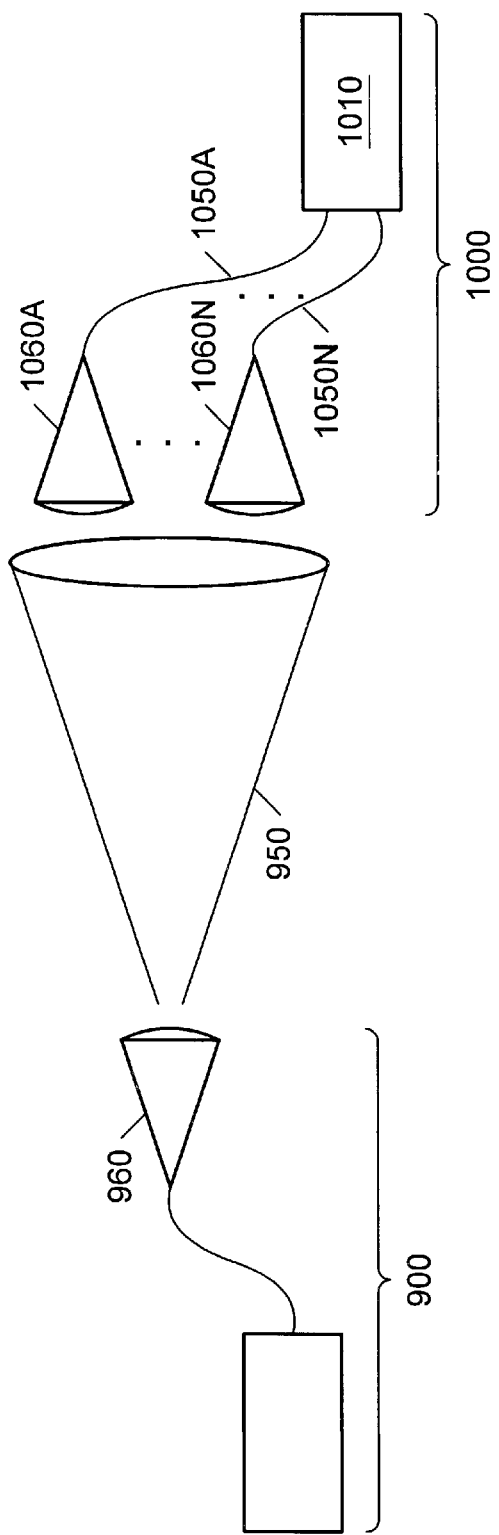
FIG. 6A illustrate an optical receiver system with an antenna array to increase receiver signal power according to the present invention.

Referring now to FIG. 6A, a receiver system 1000 with an antenna array is shown. Receiver system 1000 includes receiver electronics module 1010 and an antenna array which comprises a plurality of passive optical antennas 1060A through 1060N. Passive optical antennas 1060 are coupled to receiver electronics module 1010 through a corresponding plurality of optical fibers 1050A through 1050N. In other words, passive optical antenna 1060A is coupled to receiver electronics module 1010 through optical fiber 1050A, . . . , and passive optical antenna 1060N is coupled to receiver electronics module 1010 through optical fiber 1050N.

Figure 6B:
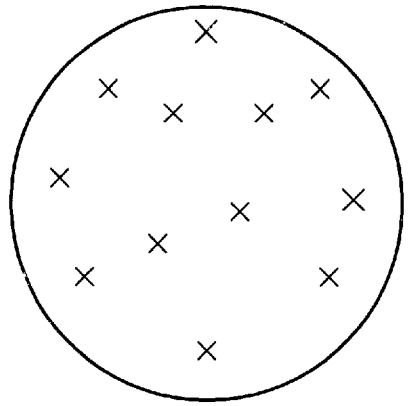
FIG. 6B illustrates a representative distribution of optical receive antennas in the cross section of the received beam according to the present invention.

Receiver system 1000 operates in conjunction with optical transmitter 900. Optical transmitter 900 transmits a first light beam 950 to passive optical antennas 1060. Thus, each of the passive optical antennas 1060 achieves a line of sight with the optical antenna 960 of optical transmitter 900. It is assumed that the first light beam has a cross-sectional area large enough to intersect more than one of passive optical antennas 1060. Each of passive optical antennas 1060 receives a portion of the first light beam, and couples its received portion onto a corresponding one of optical fibers 1050. The passive optical antennas 1060 are advantageously distributed so as to cover the cross-sectional area of the first light beam (see FIG. 6B). For example, the passive antennas 1060 may be distributed in a hexagonal, rectangular, or pseudo-random pattern to cover the first light beam cross-section.

Figure 6C:
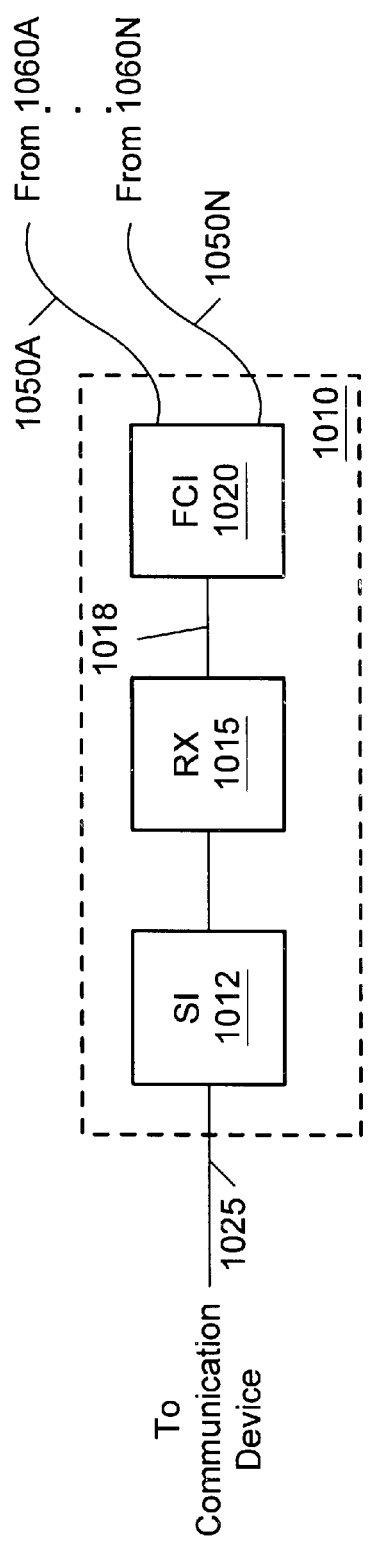
FIG. 6C illustrates the receiver electronics module of the optical receiver system of FIG. 6A according to the present invention.

Referring now to FIG. 6C, a block diagram of receiver electronics unit 1010 is shown. Receiver electronics unit 1010 includes signal interface 1012, receiver 1015, and fiber coupling interface 1020. Fiber coupling interface 1020 is configured to couple to each of the optical fibers 1050. Fiber coupling interface 1020 decouples the portions of the first light beam from the optical fibers 1050, and combines these beam portions into a single composite beam. The single composite beam 1018 is supplied to a photodetector (not shown) in receiver 1015. Receiver 1015 demodulates the composite beam 1018 and thereby recovers an information signal which is supplied to signal interface 1012. Signal interface 1010 supplies the information signal to communication bus 1025.

The receiver system 1000 of FIG. 6A demonstrates the principle of adding multiple optical antennas in order to increase the amount of light collected and supplied to the photodetector.

Figure 7:
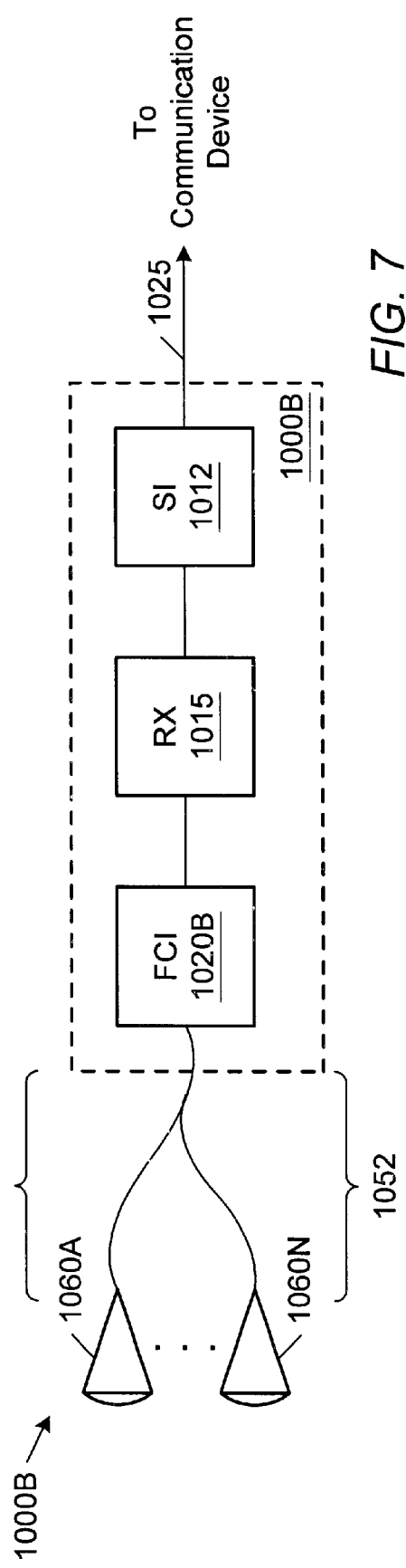
FIG. 7 illustrates a branched-fiber embodiment for the receiver system of FIG. 6A according to the present invention.

Referring now to FIG. 7, an alternate embodiment 1000B of receiver system 1000 is depicted. In the alternate embodiment 1000B, the plurality of optical fibers 1050 are replaced by a one-to-N branched optical fiber 1052, wherein N is the number of passive optical antennas 1060. The N branches couple to the optical antennas 1060, while the single opposite end couples to receiver electronics module 1010B. The one-to-N branched fiber 1052 physically combines the beam portions which propagate through the N branches into a single fiber. In this embodiment, fiber coupling interface 1020B couples to the single unified end of branched fiber 1052, and decouples the combined beam from the branched fiber 1052, and supplies the combined beam to the receiver 1015.

Figure 8:
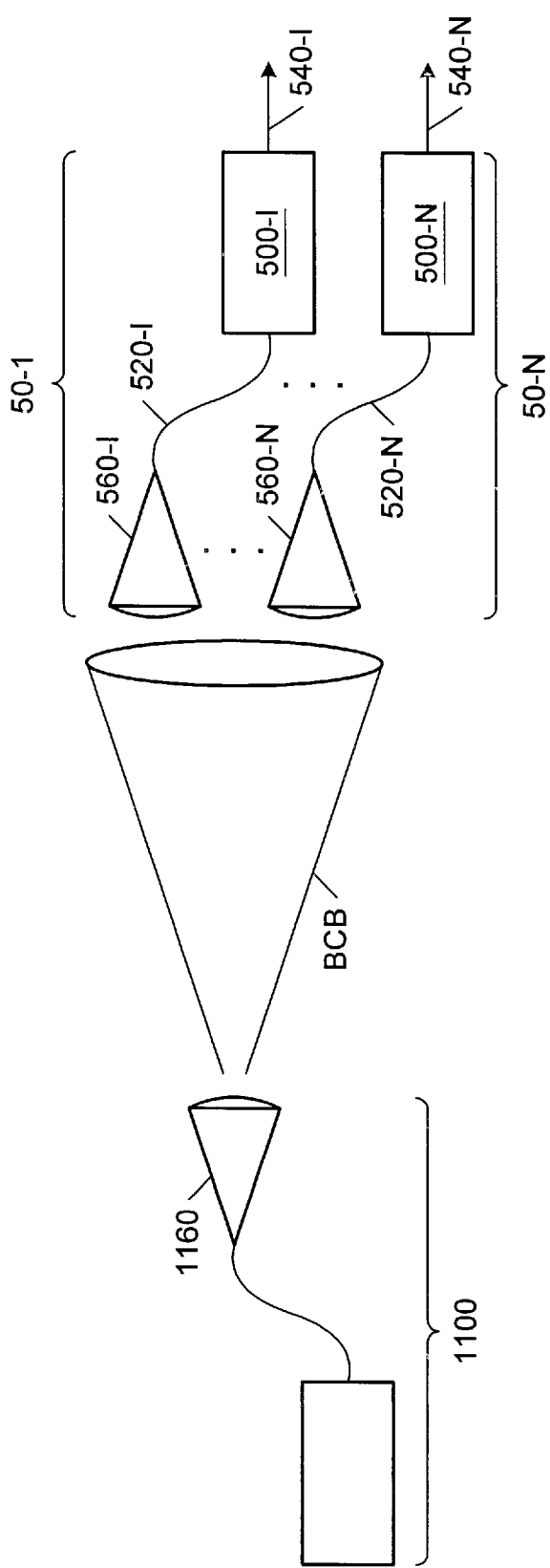
FIG. 8 illustrates use of an optical transmitter and multiple receiver systems to implement a broadcast network according to the present invention.

In an embodiment similar to the embodiment of FIG. 8, the one-to-N branched fiber is replaced by a network of one-to-two, one-to-three, or one-to-K branched fibers, where K is an integer smaller than N. For example, a one-to-four branching may be realized by three one-to-two branched fibers.

By employing the principles described above, full-duplex transceiver system 10 may be configured with an antenna array similar to antenna array similar to the antenna array 1060 of FIG. 6A or FIG. 8. Furthermore, dual-simplex transceiver system 600 may also be configured with an antenna array wherein one or more of the antennas of the array are dedicated for transmission, and remaining antennas of the array are dedicated for reception.

A Broadcast Network Embodiment

Referring now to FIG. 8, one embodiment of a broadcast network according to the present invention is depicted. An optical transmitter 1100 transmits a broadcast beam BCB to multiple optical receiver systems 50-1 through 50-N similar to receiver system 50 of FIG. 3B. The multiple optical receiver systems 50-1 through 50-N have their passive optical antennas 560-1 through 560-N aimed at the transmission antenna 1160. Optical transmitter 1100 embeds an information signal onto the broadcast beam BCB. In the embodiment shown in FIG. 8, optical transmitter 1100 is similar to transmission system 40. Each of the passive optical antennas 560-1 through 560-N intercept a portion of the broadcast beam BCB. Thus, the passive optical antennas 560-1 through 560-N are in relatively close proximity to one another. However, the fiber optic connections 520-1 through 520-N allow the receiver electronics modules 500-1 through 500-N to be located at widely disparate locations according to convenience to the respective users.

Each of the receiver systems 50-1 through 50-N demodulate the common information signal from the intercepted portion of the broadcast beam.

Optical Repeater System

Figure 9:
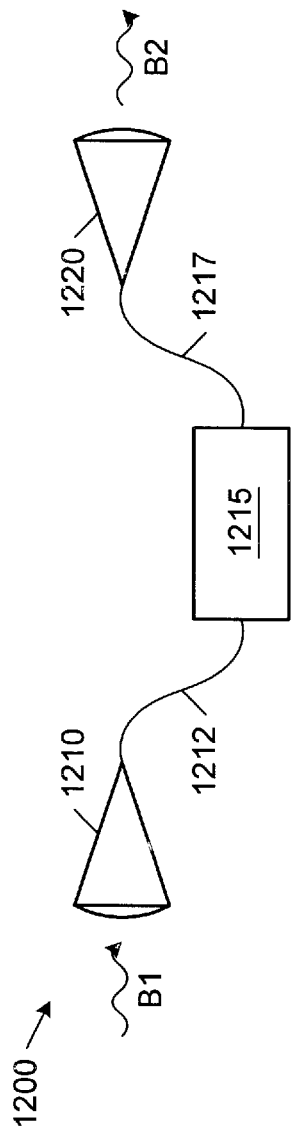
FIG. 9 illustrates an optical repeater system according to the present invention.

Referring now to FIG. 9, an optical repeater system 1200 is shown according to the principles of the present invention. Optical repeater 1200 includes a passive receive optical antenna 1210, an active electronics module 1215, and a passive transmit optical antenna 1220. The passive receive antenna 1210 is coupled to the active electronics module 1215 through a first optical fiber 1212. The passive transmit antenna is coupled to the active electronics module through a second optical fiber 1217.

The receive antenna 1210 is oriented in a first direction in order to receive a first light beam B1 from a remote transmitter (not shown). Receive antenna 1210 couples the first light beam B1 onto the first optical fiber 1212. The active electronics module 1215 decouples the first light beam B1 from the first optical fiber B1. Furthermore, active electronics module 1215 includes circuitry (a) to demodulate an information signal from the first light beam, (b) to generate and modulate a second light beam B2 according to the information signal, and (c) to couple the second light beam B2 onto the second optical fiber 1217. Transmit optical antenna 1220 decouples the second light beam B2 from the second optical fiber 1217 and transmits the second light beam B2 to a remote receiver (not shown). In one embodiment of repeater 1200, the transmit wavelength equals the receive wavelength. In another embodiment of repeater 1200, the transmit and receive wavelengths are distinct.

It is noted that a variety of optical repeater embodiments may be realized by pursuing the principle of fiber optic separation of a passive antennas and active electronics. In particular, the present invention contemplates optical repeaters in full-duplex, half-duplex, and dual-simplex realizations.

Optical repeater 1200 may be advantageously employed in a broadcast network to extend the effective range of a transmitter, or to get around an obstacle which occludes a direct line of sight between a transmitter and one or more receivers.

Multicasting Transmitter with Multiple Inline Modulators

Figure 10:
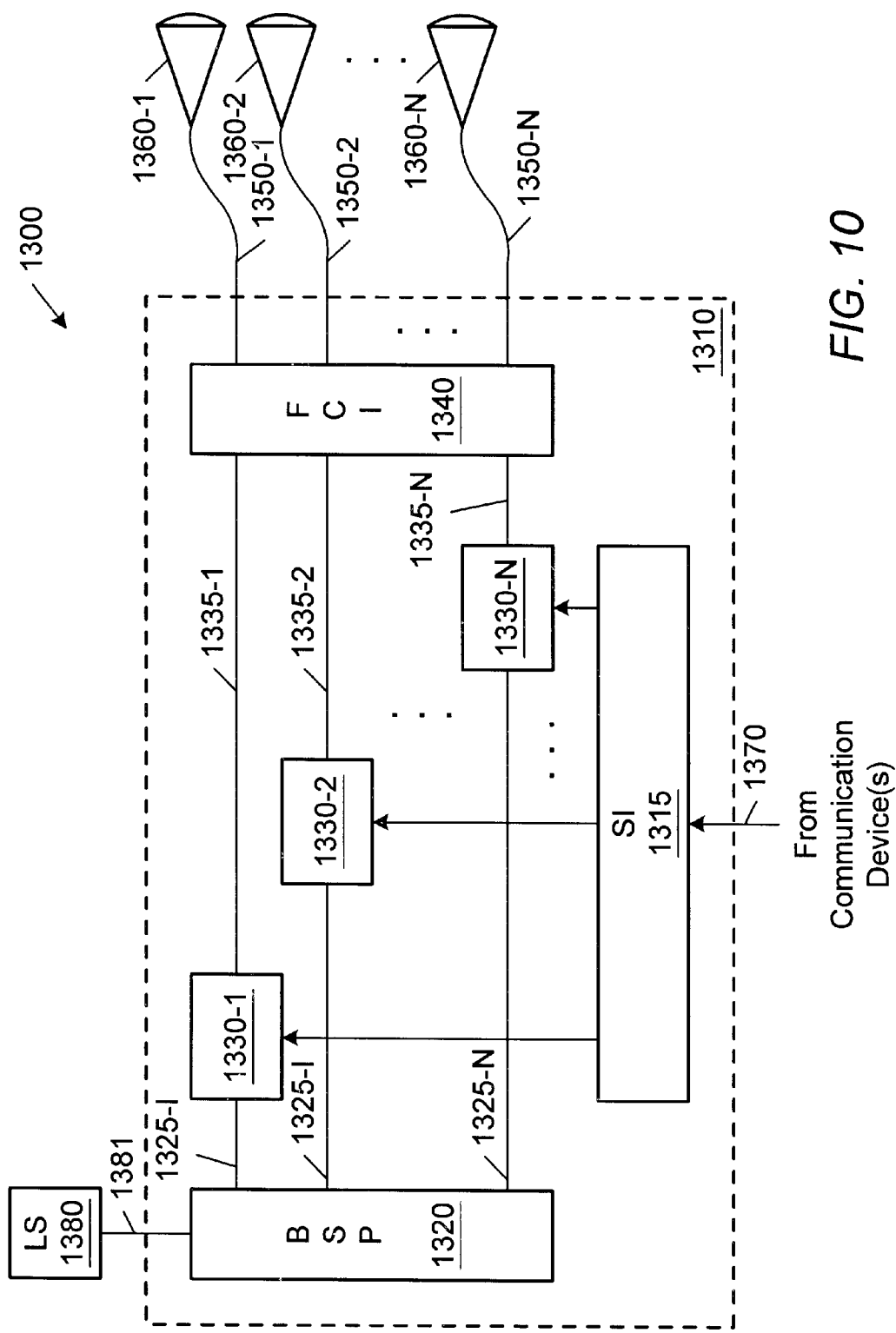
FIG. 10 illustrates a transmitter system with multiple inline modulators and multiple passive optical antennas for transmission of multiple independent data streams according to the present invention.

Referring now to FIG. 10, an optical transmission system 1300 for broadcasting multiple independent data streams to multiple spatially distributed receivers is presented. Optical transmission system 1300 includes a light source 1380, an active electronics unit 1310, and a plurality of passive optical transmission antennas 1360-1 through 1360-N. Optical antennas 1360 are coupled to active electronics module 1310 through a corresponding plurality of optical fibers 1350-1 through 1350-N as shown in FIG. 10. Light source 1380 is preferably a laser. Light source 1380 generates a first light beam 1381 which is provided to the active electronics module 1310.

Active electronics module 1310 includes signal interface 1315, beam splitter 1320, a plurality of beam modulators 1330-1 through 1330-N, and fiber coupling interface 1340. Beam splitter 1320 splits the first light beam 1381 generated by light source 1380 into a plurality of beam components 1325-1 through 1325-N. Each of the beam components 1325-I is supplied to a corresponding beam modulator 1330-I, where I is a generic value in the range 1 to N. Beam modulators 1330 receive a corresponding plurality of information signals from signal interface 1315. Each beam modulator 1330-I modulates the corresponding beam component 1325-I according to the corresponding information signal supplied by signal interface 1315. The modulated beam components 1335-1 through 1335-N are provided to fiber coupling interface 1340. Fiber coupling interface includes a plurality of connectors for the plurality of optical fibers 1350-1 through 1350-N. Fiber coupling interface 1340 couples each of the modulated beam components 1335-1 through 1335-N onto a corresponding one of the optical fibers 1350.

Each passive optical antenna 1360-I decouples a corresponding beam component from the optical fiber to which it is coupled, and transmits the beam component into the atmosphere. Since each of the optical antennas 1360-I may be independently oriented, transmission system 1300 supports transmission to a plurality of receivers which are geographically scattered.

Signal interface 1370 is configured to couple to communication bus 1370. In one embodiment, signal interface 1370 receives a data stream which contains N independent information signals from communication bus 1370. Signal interface 1370 separates the information signals, and supplies each of the information signals to a corresponding one of beam modulators 1330-1 through 1330-N. In other embodiment, communication bus may be an analog signal bus and/or include multiple independent conductors or optical fibers.

In summary, optical transmission system 1300 provides for the transmission of multiple independent information streams to multiple receivers.

It is noted that the optical transmission system 1300 may be easily modified to realize optical transceiver systems with full-duplex, half-duplex, and dual-simplex configurations.

In an alternate embodiment of active electronics module 1310, light source 1380 is included in active electronics module 1310.

Broadcast Transmitter with Inline Power Splitter

Figure 11:
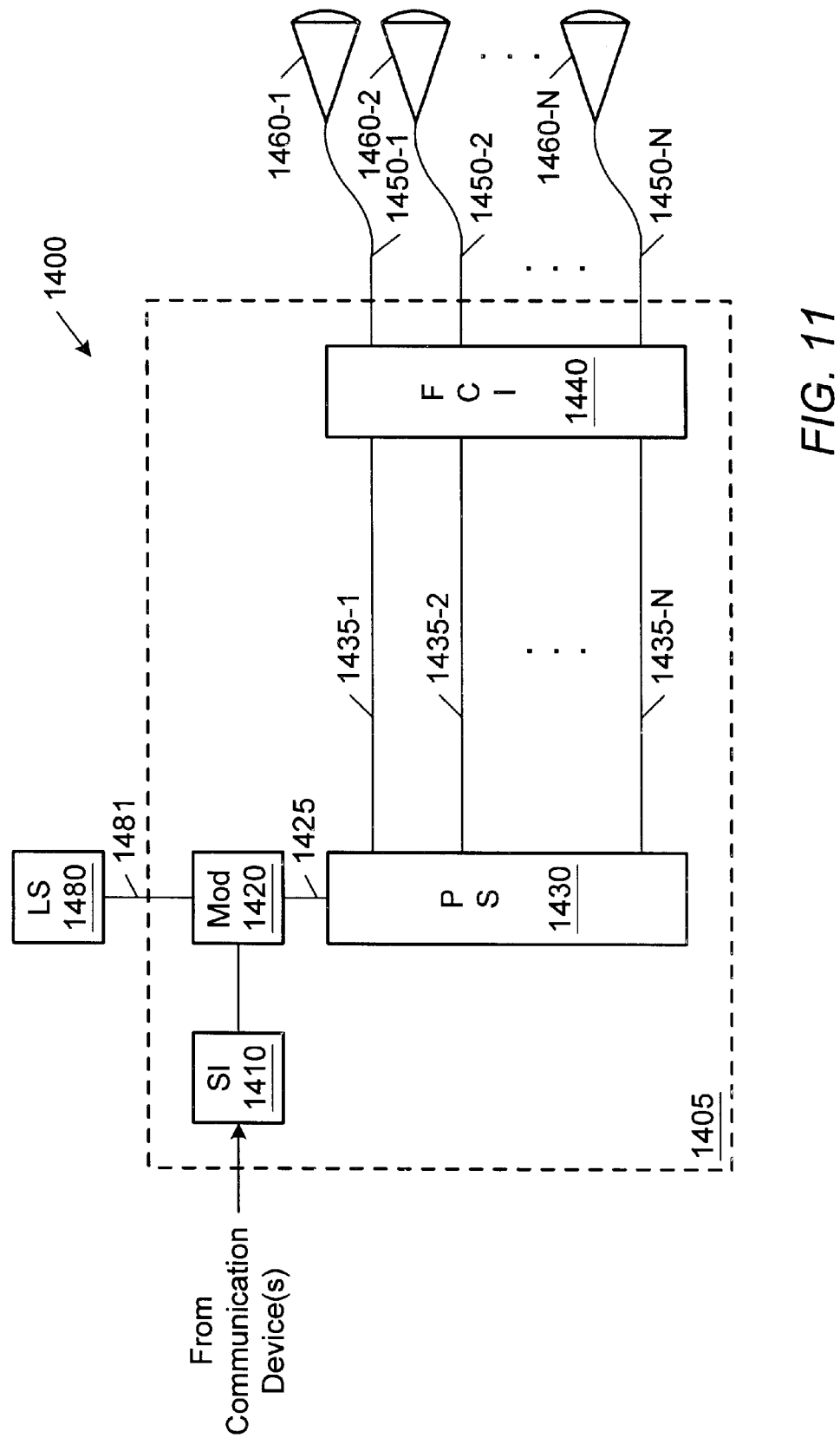
FIG. 11 illustrates a broadcast transmission system with an inline power splitter for transmitting an information signal to a plurality of receivers.

Referring now to FIG. 11, a broadcast transmission system 1400 for wireless light-beam transmission of an information signal to multiple geographically distributed users is presented. Broadcast transmission system 1400 includes a laser 1480, active electronics module 1405, and a plurality of passive optical antennas 1460-1 through 1460-N. The optical antennas 1460 are coupled to active electronics module 1405 through a corresponding plurality of optical fibers 1450-1 through 1450-N as shown in FIG. 11. Light source 1480 is preferably a laser.

Active electronics module 1405 includes signal interface 1410, modulator 1420, power splitter 1430, and fiber coupling interface 1440. Light source 1480 generates a first light beam 1481. Modulator 1420 modulates the first light beam according to an information signal supplied by signal interface 1410. The modulated light beam 1425 is supplied to power splitter 1430 which splits light beam 1425 into a plurality of beam components 1435-1 through 1435-N. Fiber coupling interface 1440 preferably includes a plurality of connectors for coupling to optical fibers 1450-1 through 1450-N. Fiber coupling interface 1440 couples each of beam components 1435-1 through 1435-N onto a corresponding one of optical fibers 1450-1 through 1450-N. Each of passive optical antennas 1460 decouples a corresponding beam component from the corresponding optical fiber and transmit the corresponding beam component into the atmosphere.

Each of the optical antennas 1460 may be oriented in a distinct direction (azimuth and elevation angle). Thus, transmission system 1400 supports transmission of an information signal to multiple independent destinations.

Switching System for Wireless Network Interconnectivity

Figure 12:
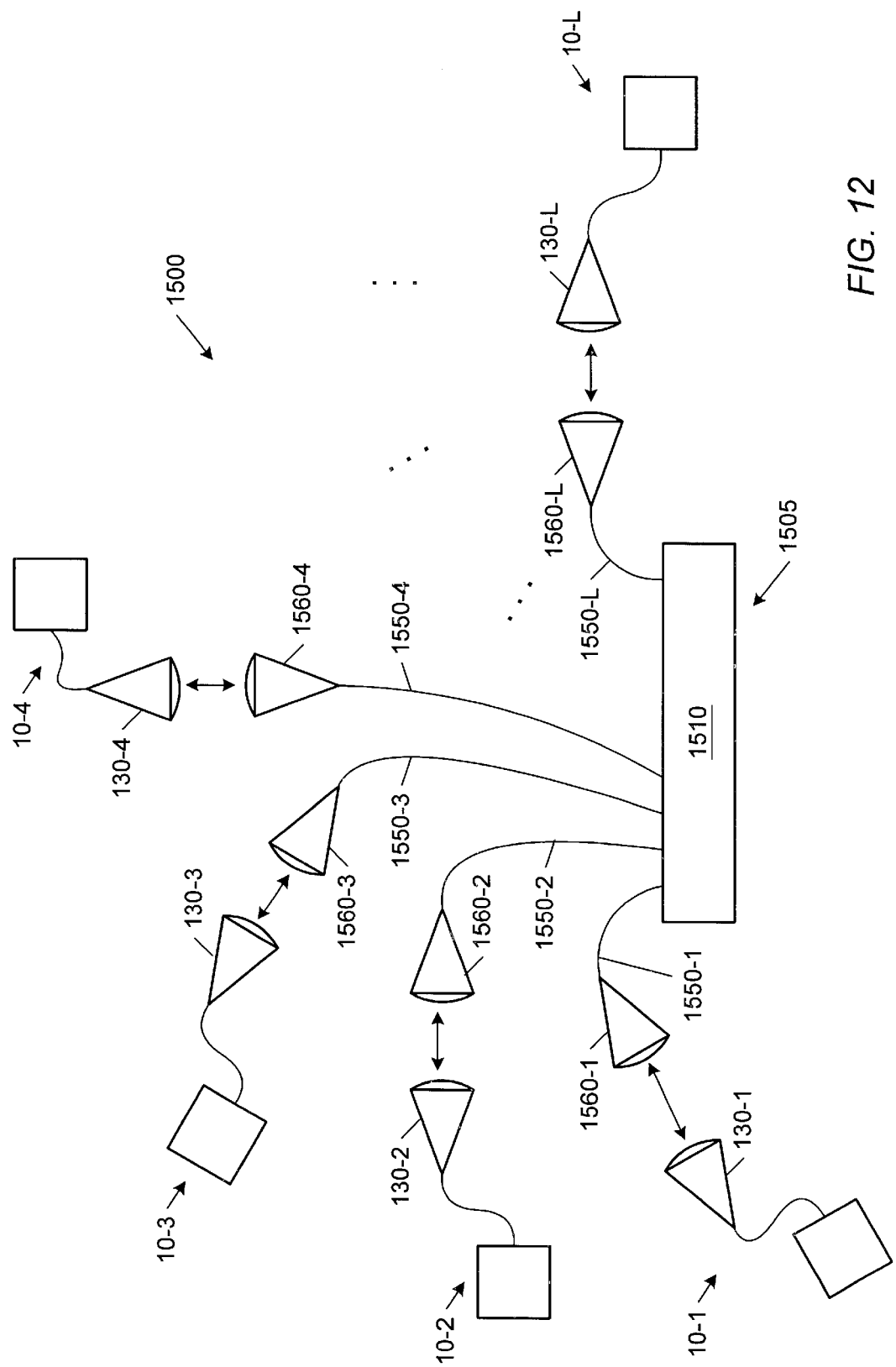
FIG. 12 illustrates optical switching system for establishing wireless communication channels among a plurality of subscribers according to the present invention.
Figure 13:
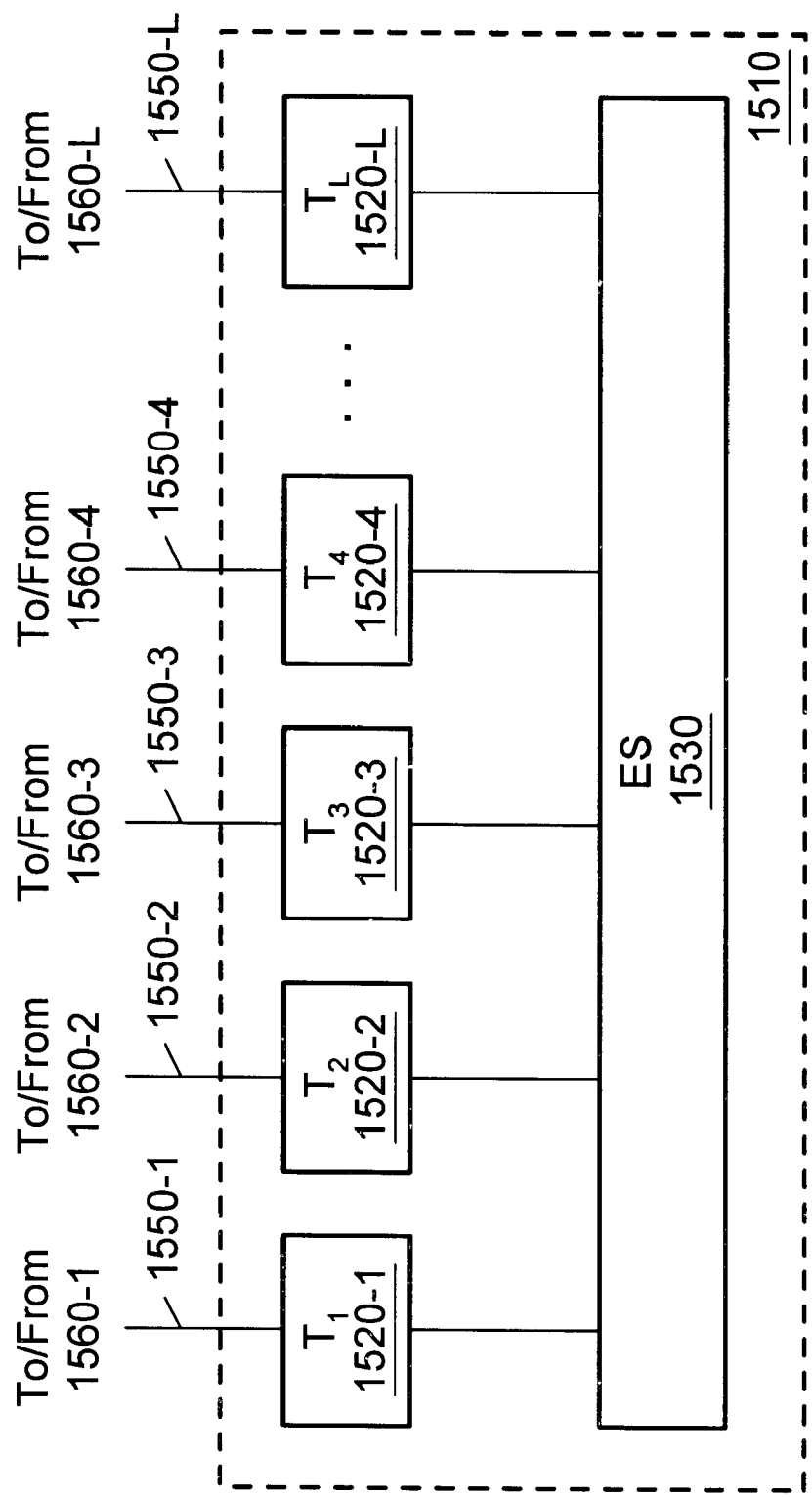
FIG. 13 illustrates the active electronics module of the optical switching system of FIG. 12 according to the present invention.

Referring now to FIG. 12, wireless network 1500 for providing interconnectivity among a number of users is presented. Wireless network 1500 includes switching system 1505 and a plurality of transceivers 10-1 through 10-L similar to transceiver system 10 of FIG. 1.

Switching system 1505 includes a plurality of passive optical antennas 1560-1 through 1560L, and active electronics module 1510. Passive optical antennas 1560 are coupled to active electronics module 1510 through a corresponding plurality of optical fibers 1550-1 through 1550-L as shown in FIG. 12. Each passive optical antenna 1560-I achieves a line of sight to optical antenna 130-I of a corresponding transceiver 10-I. The optical antenna 130-I of transceiver 10-I transmits a first light beam to optical antenna 1560-I. Optical antenna 1560-I receives the first light beam and couples the first light beam onto the corresponding optical fiber 1550-I. Furthermore, optical antenna 1550-I decouples a second light beam from optical fiber 1550-I, and transmits the second light beam to optical antenna 130-I through the atmosphere.

Active electronics module 1510 includes a plurality of transceivers 1520-1 through 1520-L coupled to an electronics switching system 1530. Each transceiver 1520-I is coupled to a corresponding optical fiber 1550-I. Furthermore, each transceiver 1520-I is configured (a) to receive the first light beam from the corresponding optical fiber, (b) to demodulate a first data signal from the first light beam, (c) to generate the second light beam, (d) to modulate a second data signal onto the second light beam, and (e) to couple the second light beam onto the corresponding optical fiber 1550-I.

Electronics switching system 1530 is configured for exchanging data signals between transceivers 1520-1 through 1520-L. In one embodiment, electronics switching system 1530 is configured to establish a number of bi-directional data channels between pairs (or subsets) of transceivers 1520. For each channeled pair (subset) of transceivers, electronics switching system 1530 exchanges (broadcasts) the second data signal produced by each transceiver to the other transceiver(s) of the pair (subset). Each transceiver of the pair uses the second data signal receiver from the other transceiver as the first data signal for beam modulation.

A Network with an Optical Router and a Primary Transceiver

Figure 14:
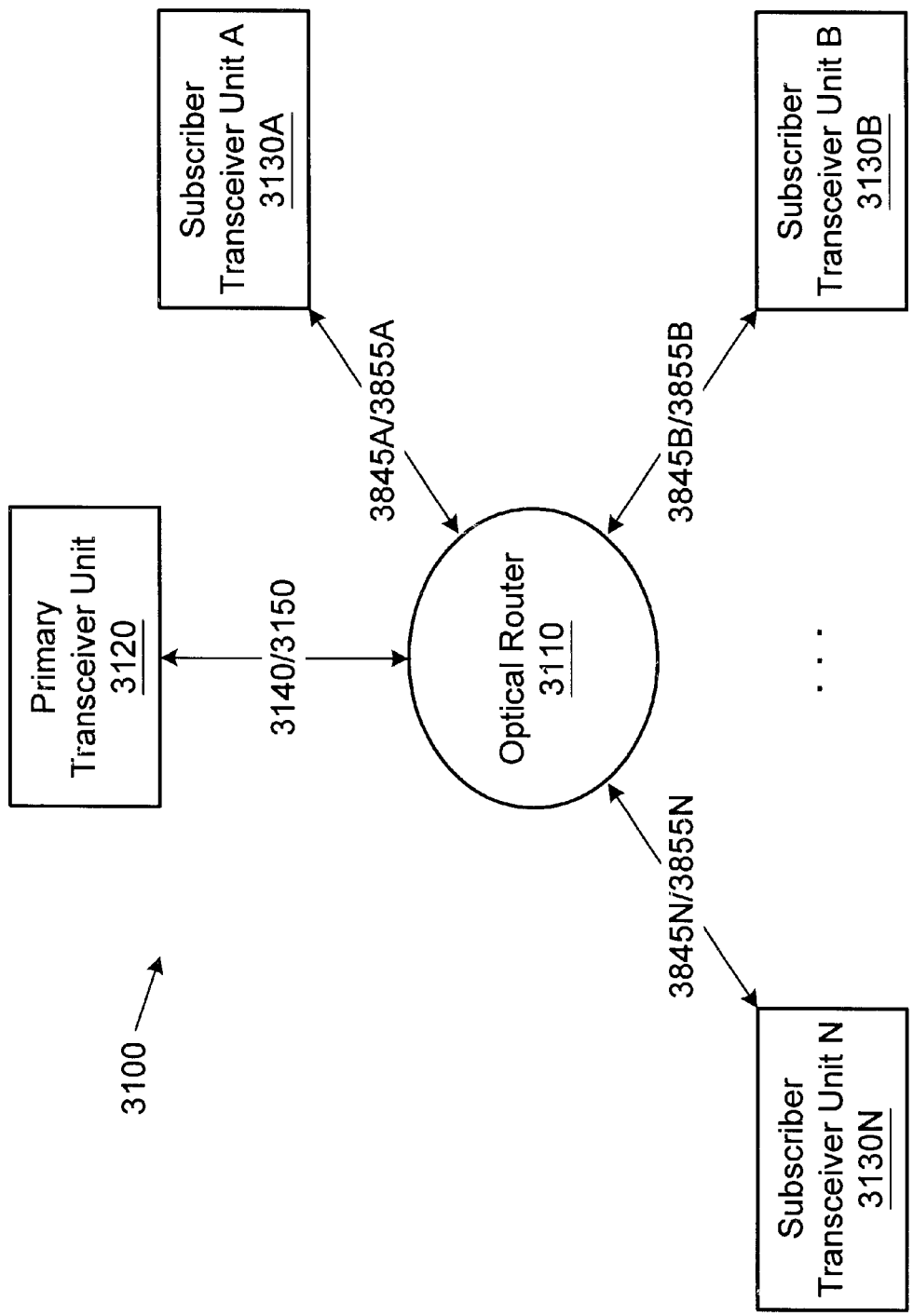
FIG. 14 illustrates a point-to-multipoint wide-area telecommunications network using atmospheric laser transmission according to the present invention.

Referring now to FIG. 14, a point-to-multipoint wide-area telecommunications network 3100 using atmospheric light beam or laser transmission according to the present invention is shown. The network 3100 preferably comprises a primary transceiver unit 3120, an optical router 3110 and a plurality of subscriber transceiver units 3130A–3130N (referred to collectively as 3130). In an alternate embodiment, the network 3100 comprises only the optical router 3110 and the plurality of subscriber transceiver units. The present invention provides a broadband bi-directional communication network with reduced infrastructure costs, i.e., no cable or fiber is required to be laid in the subscriber loop, i.e., to the subscribers.

According to the preferred embodiment of network 3100, the subscriber transceiver units are located at subscriber premises, such as homes or businesses. The optical router 3110 is located in the vicinity of the subscriber transceiver units 3130, and the optical router optically communicates with the subscriber units 3130. The optical router 3110 has an associated range of accessibility, wherein the optical router 3110 is capable of communicating with subscriber transceiver units located within a circular area around the optical router 3110. In the preferred embodiment of optical router 3110, the range of accessibility is approximately between 2000 and 4000 feet. It is contemplated, however, that optical router 3110 may be configured with larger or smaller ranges of accessibility. Each of the subscriber transceiver units 3130 is positioned in a line of sight path relative to the optical router 3110.

The optical router 3110 is positioned in a line of sight path relative to the primary transceiver unit 3120. The optical router 3110 is preferably mounted on, for example, a pole, building, or other structure approximately 75 feet above ground level. Preferably the distance between the primary transceiver unit 3120 and the optical router 3110 is approximately in the range from one half to ten miles. It is contemplated, however, that larger or smaller distances may exist between the optical router 3110 and the primary transceiver unit 3120 of network 3100

The primary transceiver unit 3120 generates a first light beam 3140 and atmospherically transmits the first light beam 3140 to the optical router 3110. In the preferred embodiment, the term "light beam" is intended to encompass any of various types of light transmission, including lasers, a super-fluorescent light source, or other coherent and/or non-coherent light or optical transmission.

The primary transceiver unit 3120 modulates data on the first light beam 3140 before transmitting the first light beam 3140 to the optical router 3110. Data may be modulated on the first light beam using any of various techniques, including amplitude and/or frequency modulation techniques, as is well known in the art.

The optical router 3110 atmospherically receives the first light beam 3140 including the data sent by the primary transceiver unit 3120 and demodulates the data, then modulates the data on and atmospherically transmits a second light beam 3845A–3845N (referred to collectively as 3845) to the subscriber transceiver units 3130. The second light beam 3845 contains at least a portion of the data sent by the primary transceiver unit 120. The subscriber transceiver units 3130 atmospherically receive the second light beam 3845 and demodulate the data sent by the primary transceiver unit 3120 from the second light beam 3845. The present invention distinguishes among different users, i.e., shares the communication bandwidth, using techniques such as time-division multiple access (TDMA) or frequency-division multiple access (FDMA). The present invention may also use code-division multiple access (CDMA) techniques.

The subscriber transceiver units 3130 atmospherically transmit a third light beam 3855A–3855N (referred to collectively as 3855) to the optical router 3110. The subscriber transceiver units 3130 modulate data on the third light beam 3855 and then transmit the third light beam 3855 to the optical router 3110. The optical router 3110 atmospherically receives the third light beam 3855 including the data sent by the subscriber transceiver units 3130 and demodulates the data, then modulates the data on and atmospherically transmits a fourth light beam 3150 to the primary transceiver unit 3120. The primary transceiver unit 3120 receives the fourth light beam 3150 and demodulates the data sent by the subscriber transceiver units 3130 from the fourth light beam 3150.

The optical router 3110 routes data between the primary transceiver unit 3120 and each of the subscriber transceiver units 3130 thus establishing channels of communication, that is, subscriber channels, on the light beams between the primary transceiver unit 3120 and the subscriber transceiver units 3130. Preferably the optical router 3110 establishes subscriber channels in a time-multiplexed fashion. During a first time-period the optical router 3110 establishes a first set of one or more subscriber channels between the primary transceiver unit 3120 and a first set of one or more subscriber transceiver units 3130. Next, the optical router 3110 establishes a second set of subscriber channels between the primary transceiver unit 3120 and a second set of subscriber transceiver units 3130 during a second time-period. The optical router 3110 proceeds in this manner, establishing a two-way or bi-directional subscriber channel with each of the subscriber transceiver units 3130 in the range of accessibility of the optical router 3110.

One embodiment of network 3100 contemplates any or all of the first light beam 3140, second light beam 3845, third light beam 3855, and fourth light beam 3150, comprising a plurality of different wavelengths, wherein data is modulated on each wavelength of the light beams, thereby advantageously increasing the bandwidth of the subscriber channels.

The network of the present invention may support a large number of subscribers. One embodiment contemplates on the order of 1000 subscriber transceiver units supported by a single optical router.

In an alternative embodiment of network 3100, primary transceiver unit 3120 receives the first light beam 3140 from another transceiver (not shown) and optically redirects the first light beam 3140 to optical router 3110. Conversely, primary transceiver 3120 optically redirects the fourth light beam 3150 from optical router 3110 to the other transceiver.

In a second alternative embodiment of network 3100, primary transceiver unit 3120 receives a source light beam from another transceiver (not shown), and demodulates data from the source light beam which then becomes the data source for modulating the first light beam. Conversely, primary transceiver unit 3120 demodulates data sent by the subscriber transceiver units from the fourth light beam 3150. The demodulated data is modulated onto a return light beam which is atmospherically transmitted to the other transceiver.

In a third alternative embodiment of network 3100, optical router 3110 communicates with another transceiver (not shown). Optical router 3110 atmospherically transmits the fourth light beam 3150 to the other transceiver for demodulation, and receives the first light beam 3140 from the other transceiver.

Thus, it may be readily observed that the elements recited above form a wireless point-to-multipoint wide-area telecommunications network. By establishing subscriber communications channels in a multiplexed manner using atmospherically transmitted light beams, the present invention advantageously provides a telecommunications network which has the potential to be much less expensive than current wired networks which rely on copper wire and/or optical fiber.

Additionally, the present invention advantageously provides a much less expensive telecommunications network than a network which employs an array of point-to-point atmospherically transmitted light beams.

Further, by employing light beams as the communications path, the present invention advantageously avoids the costs associated with licensing and purchasing bands in the radio spectrum.

Finally, the present invention advantageously provides a communications network which consumes much less power than a system which employs an angularly dispersed light beam.

In the preferred embodiment of network 3100, the primary transceiver unit 3120 communicates control information to the optical router 3110 and subscriber transceiver units 3130. The control information for the optical router 3110 contains information about the angular location of the subscriber transceiver units 3130. The control information also contains timing information to instruct the optical router 3110 regarding multiplexing of the light beams and thus establishing the subscriber communications channels. The control information for the subscriber transceiver units 3130 contains timing information instructing the subscriber transceiver units 3130 about when to transmit the third light beam 3855 to the optical router 3110. The primary transceiver unit 3120 transmits the first light beam 3140 and receives the fourth light beam 3150 cooperatively according to the control information which the primary transceiver unit 3120 communicates to the optical router 3110 and subscriber transceiver units 3130.

In the preferred embodiment of network 3100, the primary transceiver unit 3120 includes a master clock and computes timing control information based upon at least a plurality of the following factors: the data packet size, the local speed of light, the number of subscribers, the distance between the primary transceiver unit and the optical router, the distance between the optical router and the respective subscriber transceiver unit, the processing time of the subscriber transceiver units, the time associated with the electronic router (discussed below), and the switching speed of the X-Y beam deflectors (discussed below).

In the preferred embodiment of network 3100, the first light beam 3140 and the fourth light beam 3150 are substantially collinear as are the second light beam 3845 and third light beam 3855. The collinear light beam embodiment advantageously allows many of the optical components of the primary transceiver unit, optical router and subscriber transceiver units to be shared by the light beams. In this embodiment, the first light beam 3140 and the fourth light beam 3150 have different frequencies or polarities as do the second light beam 3845 and third light beam 3855 to advantageously avoid cross-talk between the two light beams. In an alternate embodiment, the first light beam 3140 and fourth light beam 3150 are in close proximity but not collinear as are the second light beam 3845 and third light beam 3855.

Figure 15:
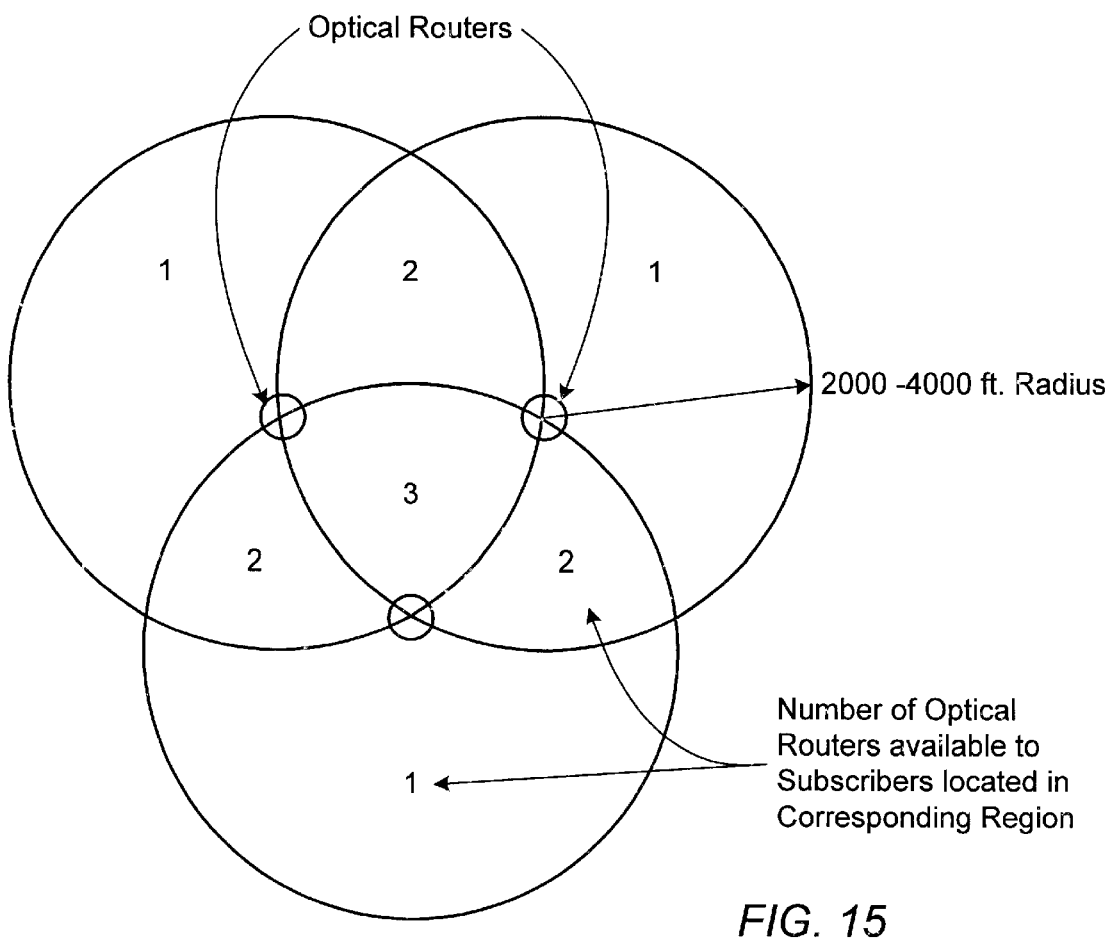
FIG. 15 illustrates the overlapping coverage achieved by the incorporation of multiple optical routers in the network of FIG. 14.

Referring now to FIG. 15, a network comprising a plurality of optical routers is shown. Each optical router has an associated range of accessibility. In one embodiment of the present invention, the optical routers are spatially located such that the accessibility ranges of some of the optical routers overlap. That is, more than one optical router is able to service a given subscriber. FIG. 15 shows various regions of coverage and indicates the number of optical routers which may service a subscriber located in the region.

In one embodiment of network 3100, if a subscriber transceiver unit detects a loss of reception of the first light beam, the subscriber transceiver unit searches for another optical router by which to receive service. By providing overlapping coverage of a given subscriber by multiple optical routers, the present invention advantageously provides an element of redundancy and hence more reliable operation.

In FIG. 15, three optical routers are shown. However, the present invention is not limited in the number of optical routers which may be serviced by a given primary transceiver unit 3120, nor the number of optical routers which may service a given subscriber transceiver unit 3130.

In one embodiment of network 3100, the primary transceiver unit 3120 comprises a plurality of light sources to generate a plurality of first light beams to transmit to a plurality of optical routers. In another embodiment of network 3100, the primary transceiver unit 3120 comprises a single light source to generate a single light beam, and the primary transceiver unit 3120 is configured to split the light beam generated by the single light source into multiple first light beams which are transmitted to a plurality of optical routers. In both embodiments the primary transceiver unit 3120 modulates subscriber data on each first light beams.

Alternate Embodiments

Figure 16:
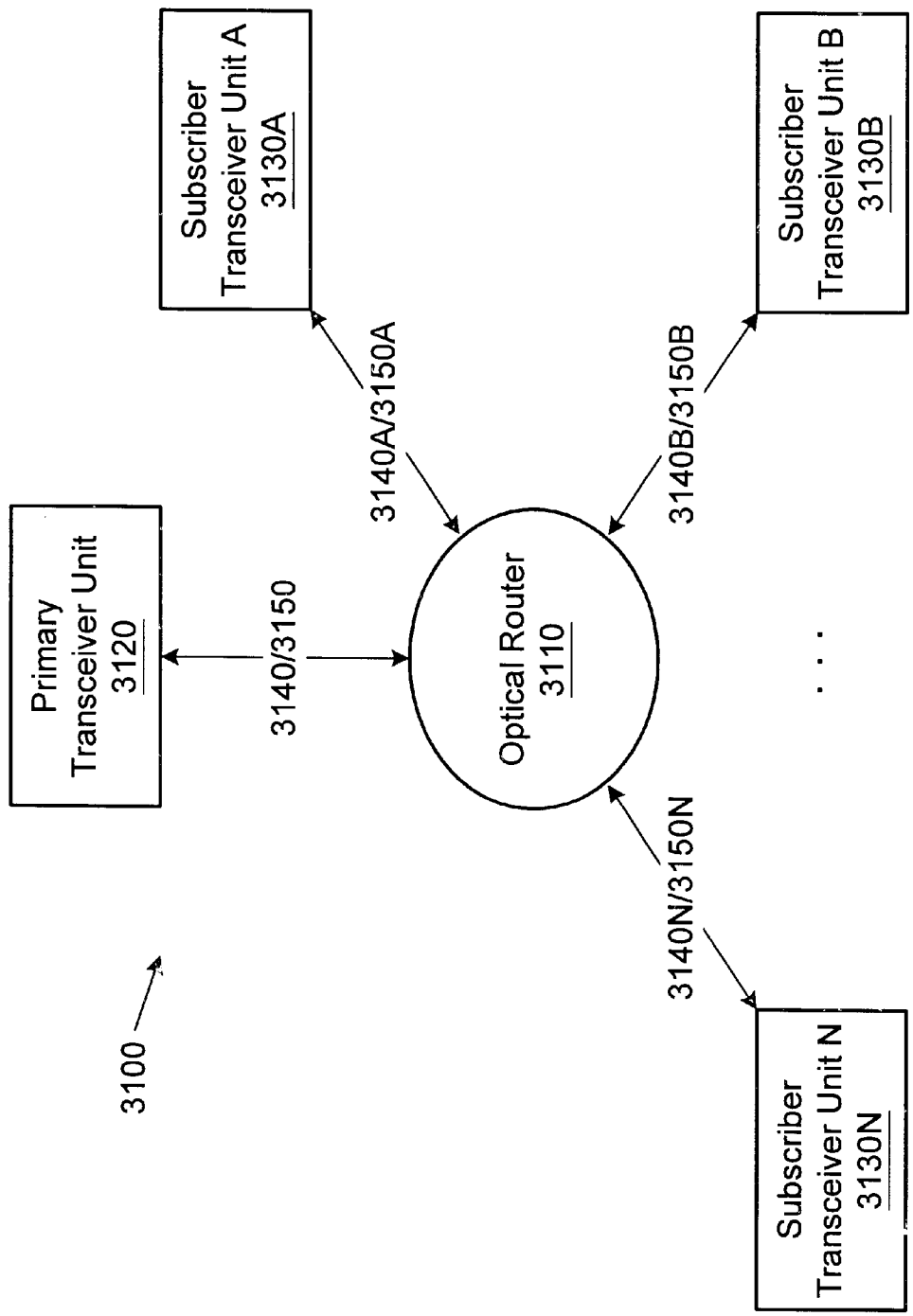
FIG. 16 illustrates a point-to-multipoint wide area telecommunications network using atmospheric laser transmission according to an alternate embodiment of the present invention.

Referring now to FIG. 16, an alternate embodiment of the network 3100 of FIG. 14 is shown. The embodiment of FIG. 16 is similar to the embodiment of FIG. 14, and corresponding elements are numbered identically for simplicity and clarity. The optical router 3110 of FIG. 16 corresponds to the alternate embodiment of the optical router 3110 shown in FIG. 20 and described below. In the alternate embodiment the optical router 3110 redirects the light beam from the primary transceiver unit 3120 to the subscriber transceiver units 3130 and redirects the light beams from the subscriber transceiver units 3130 to the primary transceiver unit 3120 rather than demodulating the data and re-modulating it. The optical router 3110 receives the first light beam 3140 and redirects the first light beam 3140 to the subscriber transceiver units 3130. The subscriber transceiver units 3130 receive the first light beam 3140 and demodulate the data sent by the primary transceiver unit 3120 from the first light beam 3140. The present embodiment distinguishes among different users, i.e., shares the communication bandwidth, using techniques such as time division multiple access (TDMA) or frequency division multiple access (FDMA). The present embodiment may also use code division multiple access (CDMA) techniques.

The subscriber transceiver units 3130 atmospherically transmit a second light beam 3150A–3150N (referred to collectively as 3150) to the optical router 3110. The subscriber transceiver units 3130 modulate data on the second light beam 3150 and then transmit the second light beam 3150 to the optical router 3110. The optical router 3110 receives the second light beam 3150 and redirects the second light beam 3150 to the primary transceiver unit 3120. The primary transceiver unit 3120 receives the second light beam 3150 and demodulates the data sent by the subscriber transceiver units 3130 from the second light beam 3150. Alternatively, the optical router 3110 and/or the primary transceiver unit 3120 provide the second light beam 3150 to another transceiver (not shown) for demodulation, wherein this other transceiver is in communication with the primary transceiver unit 3120.

The optical router 3110 redirects the first and second light beams between the primary transceiver unit 3120 and each of the subscriber transceiver units 3130 during different time periods, that is, in a time-multiplexed manner. In other words, the optical router 3110 establishes channels of communication comprising the light beams between the primary transceiver unit 3120 and the subscriber transceiver units 3130 in distinct time slices. Thus, during a first time period the optical router 3110 establishes a first subscriber channel by redirecting the first light beam 3140 from the primary transceiver unit 3120 to a first subscriber transceiver unit 3130 and redirecting the second light beam 3150 from the first subscriber transceiver unit 3130 to the primary transceiver unit 3120. Next, the optical router 3110 establishes a second subscriber channel between the primary transceiver unit 3120 and a second subscriber transceiver unit 3130 during a second time period. The optical router 3110 proceeds in this manner, establishing a two-way or bi-directional subscriber channel with each of the subscriber transceiver units 3130 in the range of accessibility of the optical router 3110.

An alternate embodiment of the network 3100 contemplates an alternate multiplexing scheme wherein the primary transceiver unit 3120 is configured to generate and/or transmit a first light beam 3140 which comprises a plurality of different wavelengths which correspond to the subscribers. The optical router 3110 receives the first light beam and provides each of the wavelength portions to the respective subscriber transceiver units. In this embodiment, the optical router 3110 includes a grating, such as a diffraction grating, which separates the different frequency or spectra and provides the different wavelength portions to the respective subscribers. Additionally, each subscriber transceiver unit is configured to generate a second light beam of one or more respective unique wavelengths. The optical router 3110 redirects the respective wavelength light beams of the first and second light beams between the primary transceiver unit 3120 and respective subscriber transceiver units 3130, that is, in a frequency-multiplexed manner. Alternately stated, the optical router 3110 establishes subscriber channels of communication on the light beams between the primary transceiver unit 3120 and the subscriber transceiver units 3130 based upon different wavelength portions of a light beam. Thus, the optical router 3110 establishes a first subscriber channel by redirecting a first wavelength portion of the first light beam from the primary transceiver unit 3120 to a first subscriber transceiver unit 3130 and redirecting the second light beam 3150 comprising the first wavelength from the first subscriber transceiver unit 3130 to the primary transceiver unit 3120. Simultaneously, the optical router 3110 establishes a second subscriber channel between the primary transceiver unit 3120 and a second subscriber transceiver unit 3130 using a second wavelength portion of the first light beam 3140 and a second light beam 3150 comprising the second wavelength. The optical router 3110 operates in this manner, establishing a subscriber channel with subscriber transceiver units 3130 in the range of accessibility of the optical router 3110. By employing multiple wavelength light beams and FDMA techniques, the invention advantageously increases the bandwidth available to the subscribers.

Another alternate multiplexing embodiment is contemplated in which the optical router 3110 establishes subscriber communication channels in a combined time-multiplexed and frequency-multiplexed manner. A subscriber requiring increased data bandwidth employs a subscriber transceiver unit configured to receive multiple light beams of differing wavelengths and/or multiple time-slots, thereby multiplying the bandwidth available to the subscriber. In another embodiment, the present invention employs code division multiple access (CDMA) techniques using bipolar codes.

The present invention contemplates an alternate embodiment of the network 3100 comprising unidirectional data transmission, that is, broadcast or point-to-multipoint data communication only from the primary transceiver unit 3120 and/or optical router 3110 to the subscriber transceiver units 3130. In this embodiment, the subscriber transceiver units 3130 do not generate light beams back through the optical router 3110 to the primary transceiver unit 3120. Other aspects of this alternate embodiment are as described above in the preferred embodiment of FIG. 14 and the alternate embodiment of FIG. 16. This alternate embodiment is contemplated as an advantageous alternative to current implementations of broadcast television, particularly high definition television, or cable television, for example. Thus this embodiment may comprise a pure broadcast (one-way) network. Alternatively, the network 3100 may use a different return path from the subscriber units 3130 to the primary transceiver unit 3120, such as an analog modem (POTS) or ISDN.

The present invention further contemplates an alternate embodiment of the network 3100 in which the primary transceiver unit 3120 essentially resides in the same location as the optical router 3110. Alternately stated, the primary transceiver unit 3120 and the optical router 3110 are essentially combined into a single unit. In this embodiment the light source of the primary transceiver unit 3120 transmits only a few inches or feet into the optical router 3110. Various elements of the primary transceiver unit 3120 and optical router 3110 may be eliminated or combined in such an embodiment. In this embodiment, fiber optic cable may be used to transfer the light beam directly to the optical router 3110, and thus a separate primary transceiver unit 3120 is not needed.

The Optical Router

Figure 17:
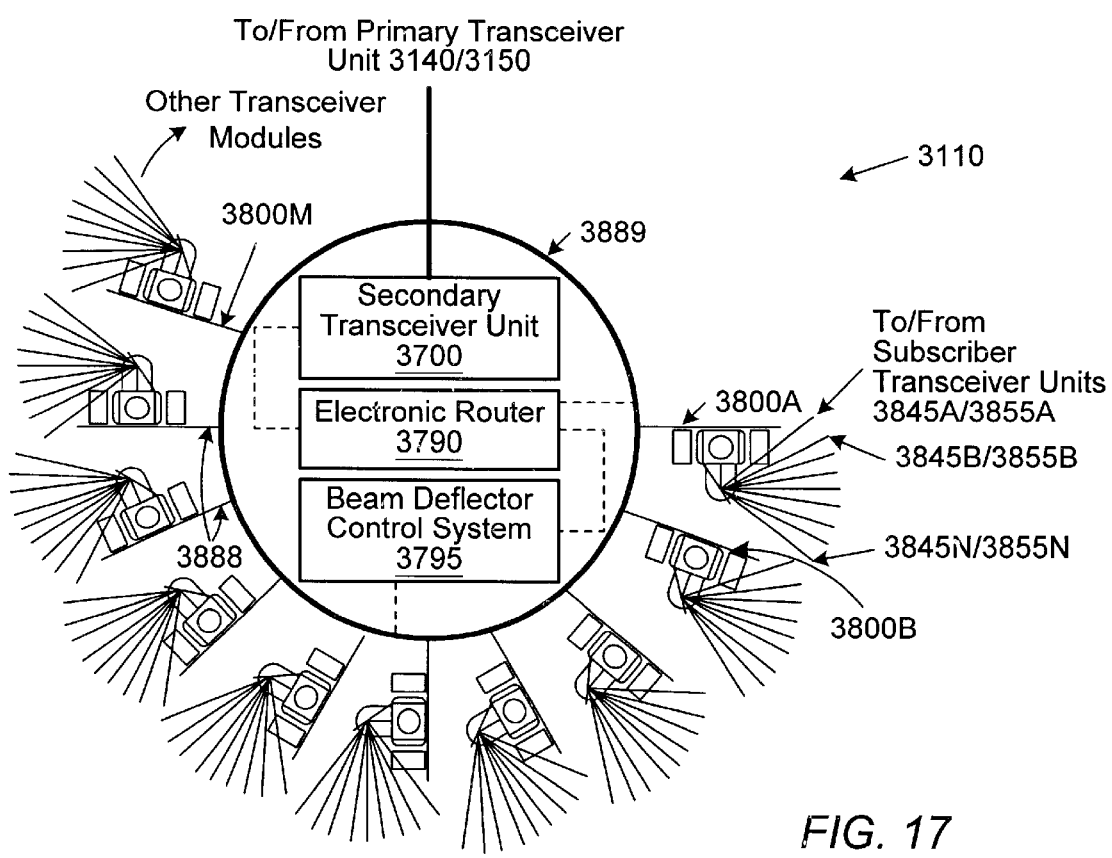
FIG. 17 illustrates the preferred embodiment of the optical router in the network of FIG. 14.

Referring now to FIG. 17, the preferred embodiment of the optical router 3110 in the network 3100 (of FIG. 14) is shown. The optical router 3110 comprises a secondary transceiver unit 3700 coupled to a plurality of transceiver modules 3800A–3800M (referred to collectively as 3800) by an electronic router 3790. The transceiver modules 3800 are coupled to a circular backplane 3889. The electronic router 3790 is coupled to the transceiver modules 3800 through the backplane 3889.

Transceiver module 3800A (representative of the transceiver modules 3800) has a backplane connector 3888 which connects the transceiver module 3800A to the backplane. The transceiver module 3800A is configured to transmit the second light beam 3845 to and receive the third light beam 3855 from a portion of the subscriber transceiver units 3130, namely those subscriber transceiver units 3130 within a portion of the circular area around the optical router 3110. The transceiver modules 3800 collectively provide the optical router 3110 with a 360 degree range of accessibility to the subscriber transceiver units 3130.

A beam deflector control system 3795 is coupled through the backplane 3889 to the transceiver modules 3800 for controlling the deflection of the second light beam 3845 and third light beam 3855 by the transceiver modules 3800. The beam deflector control system 3795 is also coupled to the electronic router 3790 and receives beam deflector control information from the primary transceiver unit 3120 through the electronic router 3790.

The electronic router 3790 receives routing control information from the primary transceiver unit 3120. The routing control information regards the routing of data sent by the primary transceiver unit 3120 from the secondary transceiver unit 3700 to the various transceiver modules 3800 for atmospheric transmission to the subscriber transceiver units 3130. Conversely, the routing control information regards the routing of data sent by the subscriber transceiver units 3130 from the various transceiver modules 3800 to the secondary transceiver unit 700 for atmospheric transmission to the primary transceiver unit 3120.

The secondary transceiver unit 3700 atmospherically receives the first light beam 3140 including the data sent by the primary transceiver unit 3120 and demodulates the data. The secondary transceiver unit 3700 communicates the data sent by the primary transceiver unit 3120 to the electronic router 3790. The electronic router 3790 routes the data from the secondary transceiver unit 3700 to the appropriate one of the transceiver modules 3800. For illustration purposes let us assume transceiver module 3800A is the appropriate transceiver module 3800. The transceiver module 3800A receives the data and modulates the data onto the second light beam 3845 which is atmospherically transmitted to the appropriate subscriber transceiver unit 3130A.

Figure 18:
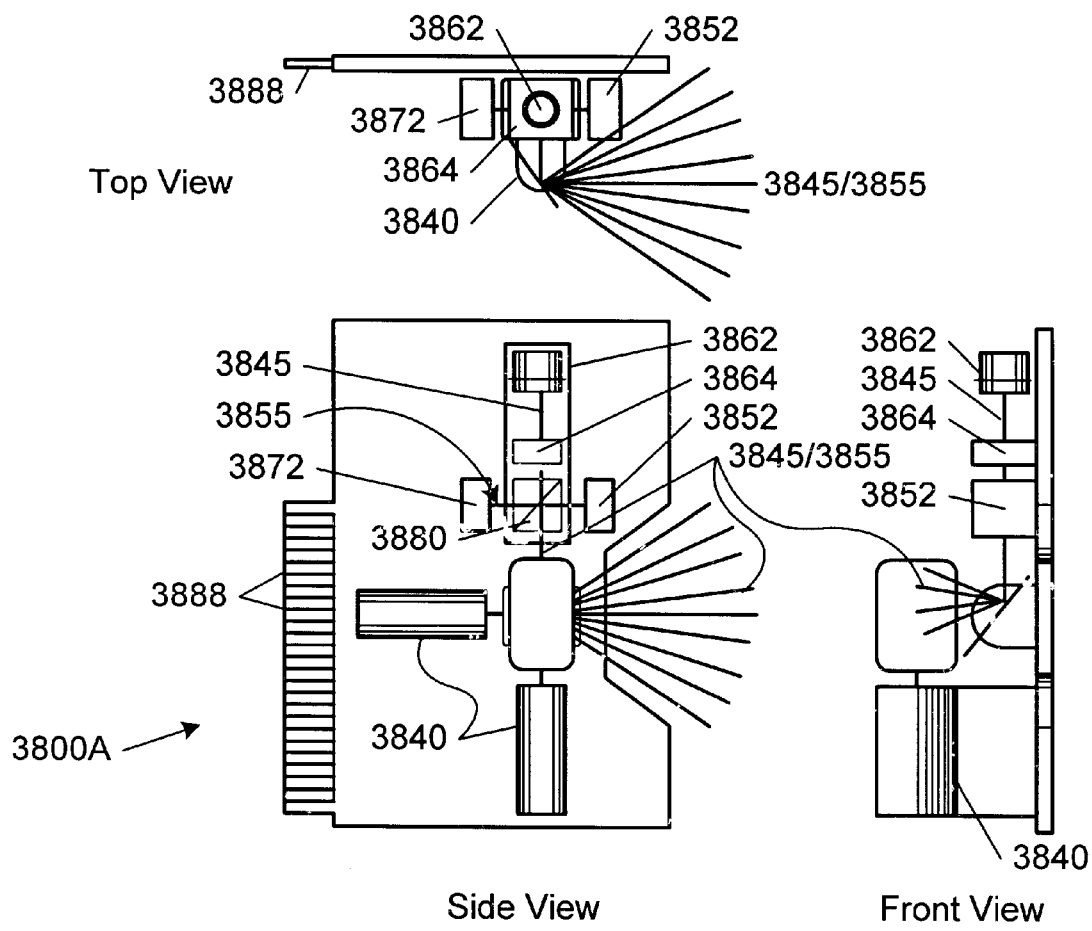
FIG. 18 is a plan view of one of the transceiver modules of FIG. 17.

Conversely, the transceiver module 3800A receives the third light beam 3855 including data from the subscriber transceiver unit 3130 and demodulates the data. The transceiver module 3800A communicates the data sent by the subscriber transceiver unit 3130A to the electronic router 3790. The electronic router 3790 routes the data from the transceiver module 3800A to the secondary transceiver unit 3700. The secondary transceiver unit 700 modulates the data sent by the subscriber transceiver unit 3130A onto the fourth light beam 3150 and atmospherically transmits the fourth light beam 3150 including the data sent by the subscriber transceiver unit 3130A to the primary transceiver unit 3120.
FIG. 18

Referring now to FIG. 18, a plan view of the transceiver module 3800A of the optical router 3110 of FIG. 17 is shown. The transceiver module 3800A comprises a light source 3862 configured to generate the second light beam 3845. A beam modulator 3864 receives data which was sent by the primary transceiver unit 3120 from the electronic router 3790 through the backplane connector 3888 and modulates the data onto the second light beam 3845. The second light beam 3845 is deflected by an X-Y beam deflector 3840 to the subscriber transceiver unit 3130A.

Preferably the X-Y beam deflector 3840 is a galvanometer mirror pair. Galvanometer mirrors are well known, particularly in the art of laser printer technology and the art of laser light shows. Alternatively the X-Y beam deflector 3840 is an acousto-optic or solid state beam deflector. The optical router 3110 light source 3862 preferably comprises one or more continuous wave or pulsed beam lasers as are well known in the art, such as gas, solid state or diode lasers. The beam modulator 3864 preferably comprises an electro-optic cell. Alternatively, the beam modulator 3864 is a bulk type modulator. The light source and beam modulator configuration is indicative of those well known in fiber optic communication link transmission systems. However, the laser power output is typically significantly greater than those used in fiber optic systems.

While the X-Y beam deflector 3840 deflects the second light beam 3845 to the subscriber transceiver unit 3130A the X-Y beam deflector 3840 simultaneously deflects the third light beam 3855 from the subscriber transceiver unit 3130A to a beam splitter 3880. The beam splitter 3880 splits a relatively large portion of the third light beam 3855 to a beam demodulator 3872 which receives the third light beam 3855 and demodulates data sent by the subscriber transceiver unit 3130A from the third light beam 3855. The beam demodulator 3872 communicates the data through the backplane connector 3888 to the electronic router 3790. The beam demodulator 3872 preferably comprises a photodiode as is common in the art.

During a first time period, the X-Y beam deflector 3840 deflects the second light beam 3845 from the light source 3862 to a first subscriber transceiver unit 3130A and deflects the third light beam 3855 from the first subscriber transceiver unit 3130A to the beam demodulator 3872. Hence, the transceiver module 3800A establishes a bi-directional communications channel using the second and third light beams between the transceiver module 3800A and the first subscriber transceiver unit 3130A for a first period of time. Hence, the bi-directional communications channel between the transceiver module 3800A and the first subscriber transceiver unit 3130A comprises a portion of the subscriber channel described above between the primary transceiver unit 3120 and the subscriber transceiver unit 3130A. During subsequent periods of time the X-Y beam deflector 3840 deflects the second and third light beams to and from other subscriber transceiver units 3130 in a time-multiplexed manner.

Each of the transceiver modules 3800 establishes bi-directional communication channels as just described between the given transceiver module and the portion of the subscriber transceiver units 3130 accessible by the given transceiver module in a time-multiplexed fashion and simultaneously with the other transceiver modules. In this manner, a portion of a wireless point-to-multipoint bi-directional wide area telecommunications network is advantageously formed between the optical router 3110 and the subscriber transceiver units 3130.

Figure 19:
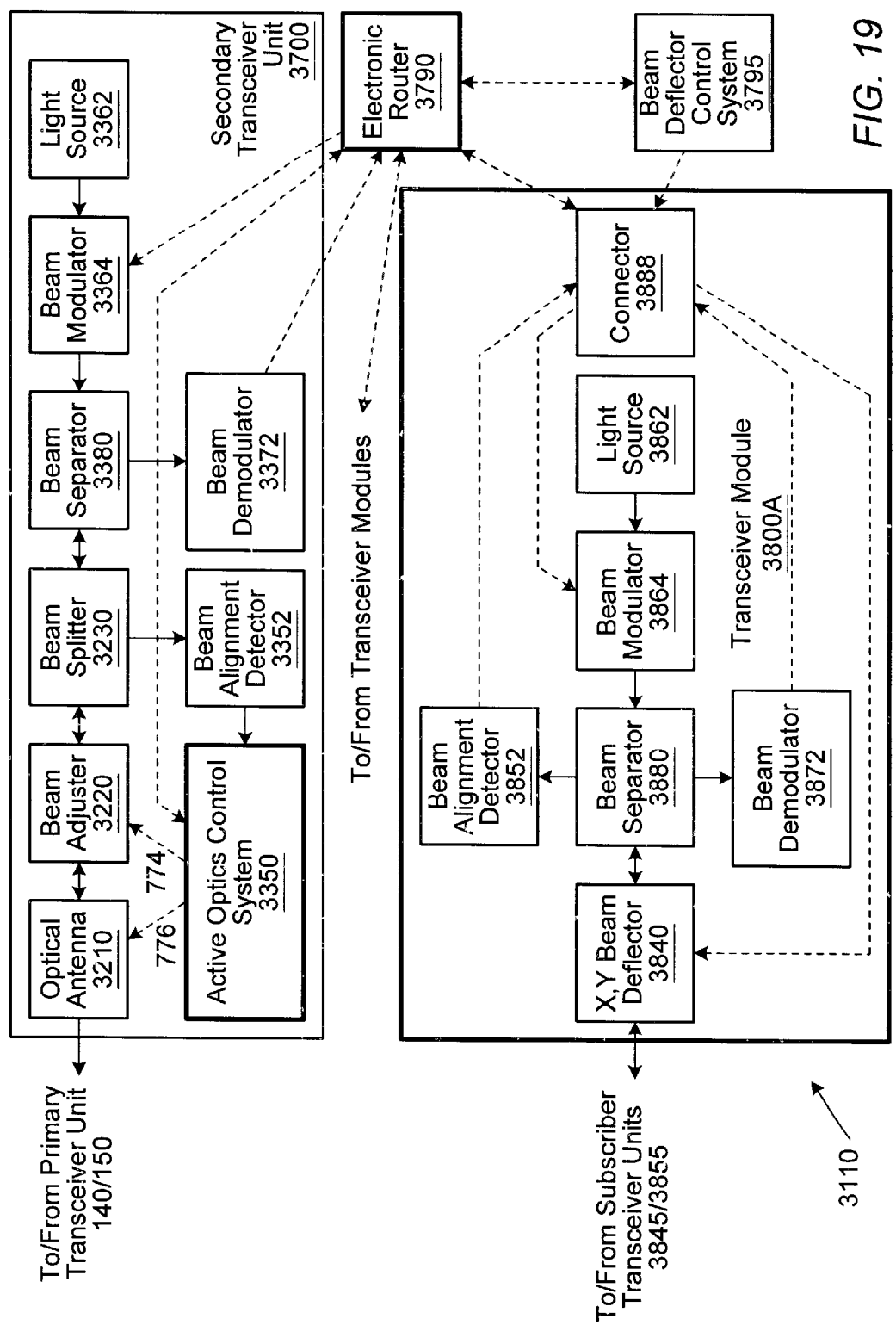
FIG. 19 is a block diagram of the optical router of FIG. 17, including a detailed block diagram of the secondary transceiver unit.

The beam splitter 3880 splits a relatively small portion of the third light beam 3855 to a beam alignment detector 3852 which receives the split portion of the third light beam 3855 and detects misalignment or wander of the third light beam 3855 from the subscriber transceiver unit 3130A which may occur and stores the beam stabilization information. The beam alignment detector 3852 communicates the beam stabilization information through the backplane 888 via the electronic router 3790 to the secondary transceiver unit 3700. The secondary transceiver unit 3700 transmits the beam stabilization information to the primary transceiver unit 3120. The primary transceiver unit 3120 communicates the beam stabilization information to the given subscriber transceiver unit so that the subscriber transceiver unit can adjust the beam for misalignment or wander appropriately. Atmospheric turbulence and density variations along the atmospheric path between the subscriber transceiver unit 3130A and the optical router 3110 may account for misalignment of the third light beam 3855 on the X-Y beam deflector 3840 of the transceiver module 3800A. Likewise, events such as ground shifting or tower sway may cause the positions of the subscriber transceiver unit 3130A or optical router 3110 relative to each other to change.
FIG. 19

Referring now to FIG. 19, a block diagram of the optical router 3110 of FIG. 17 is shown including a detailed block diagram of the secondary transceiver unit 3700. A transceiver module 300A is coupled to the electronic router 3790 through the backplane 3889. The electronic router 3790 is also coupled to the other transceiver modules 3800 (not shown). The electronic router 3790 is coupled to the beam deflector control system 3795 and to the secondary transceiver unit 3700.

The secondary transceiver unit 3700 comprises an optical antenna 3210 which receives the first light beam 3140 from the primary transceiver unit 3120. The optical antenna 3210 also transmits the fourth light beam 3150 to the primary transceiver unit 3120. The optical antenna 3210 preferably comprises an optical system with a conic mirror, which is well known in the art. Alternatively the optical antenna 3210 is a collecting lens system which is also well known in the art. The optical antenna 3210 and associated optics converge and re-collimate the incoming first light beam 3140 to a relatively small diameter, preferably in the range of 1 to 3 millimeters. Conversely, the optical antenna 3210 receives a relatively small diameter fourth light beam 3150 generated by a light source 3362 and expands and re-collimates the fourth light beam 3150 for atmospheric transmission to the primary transceiver unit 3120.

The optical antenna 3210 atmospherically receives the first light beam 3140 including the data sent by the primary transceiver unit 3120 (of FIG. 1) from the primary transceiver unit 3120 and directs the first light beam 3140 to a beam demodulator 3372. The beam demodulator 3372 demodulates the data sent by the primary transceiver unit 3120 from the first light beam 3140 and communicates the data to the electronic router 3790. The data sent by the primary transceiver unit 3120 comprises subscriber data as well as control data. The control data comprises routing control information for the electronic router 3790 as well as timing control information and angular position control information of the subscriber transceiver units 3130 for the beam deflector control system 3795. The electronic router 3790 uses the routing control information to route the subscriber data to the appropriate transceiver modules 3800. The electronic router 3790 communicates the timing control information and the angular position control information to the beam deflector control system 3795. The beam demodulator 3372 preferably comprises a photo-diode as is common in the art.

The light source 3362 generates the fourth light beam 3150. The electronic router 3790 routes the data sent by the subscriber transceiver units 3130 from the transceiver modules 3800 to a beam modulator 3364. The beam modulator 3364 modulates the data sent by the subscriber transceiver units 3130 onto the fourth light beam 3150 for transmission to the optical antenna 3210 and on to the primary transceiver unit 3120.

The light source 3362 preferably comprises one or more continuous wave or pulsed beam lasers as are well known in the art, such as gas, solid state or diode lasers. The beam modulator 3364 preferably comprises an electro-optic cell. Alternatively, the beam modulator 3364 is a bulk type modulator. The light source and beam modulator configuration is indicative of those well known in fiber optic communication link transmission systems. However, the laser power output is typically significantly greater than those used in fiber optic systems.

As the first light beam 3140 passes from the optical antenna 3210 to the beam demodulator 3372 the first light beam 3140 is directed toward the beam demodulator 3372 by a beam separator 3380. Conversely, as the fourth light beam 3150 passes from the light source 3362 to the optical antenna 3210 the fourth light beam 3150 passes through the beam separator 3380.

The X-Y beam deflector 3840 is coupled through the backplane 3889 to the beam deflector control system 3795. The beam deflector control system 3795 controls the switching of the X-Y beam deflector 3840 to deflect the second light beam 3845 and third light beam 3855 to and from the desired subscriber transceiver unit 3130 at the desired time. Thus in a time-multiplexed fashion the beam deflector control system controls the establishing of the portion of the subscriber channels between the subscriber transceiver units 3130 and the transceiver modules 3800.

Preferably, the beam deflector control system 3795 receives control information from the primary transceiver unit 3120 to control the X-Y beam deflector 3840. The control information for the beam deflector control system 3795 contains information about the angular location of the subscriber transceiver units 3130. The beam deflector control system 3795 uses the subscriber transceiver unit angular location information to determine the desired deflection angles of the X-Y beam deflector 3840.

As mentioned in the discussion of FIG. 14, the primary transceiver unit 3120 also preferably transmits multiplexing control information to the optical router 3110 and to the subscriber transceiver units 3130. The primary transceiver unit 3120 transmits the control information for one or more subscriber channels prior to transmitting the subscriber data packets associated with the one or more subscriber channels. The multiplexing information is timing information used by the beam deflector control system 3795 to control the X-Y beam deflector 3840 regarding when to deflect the second and third light beams to and from a given subscriber transceiver unit 3130.

The subscriber transceiver unit transmits the third light beam 3855 containing data for the primary transceiver unit 3120 to the optical router 3110 at a time determined by the primary transceiver unit 3120. Correspondingly, the transceiver module servicing the subscriber transceiver unit transmits the second light beam with the data modulated for the subscriber transceiver unit to arrive at the X-Y beam deflector at substantially the same time as the third light beam 3855 containing data from the first subscriber arrives at the optical router 3110. The primary transceiver unit 3120 transmits the first light beam 3140 containing data for the subscriber transceiver unit to arrive at the optical router 3110 at a time such that the data may be demodulated, routed, modulated on the second light beam 3845 and the second light beam 3845 transmitted to arrive at the X-Y beam deflector 3840 at substantially the same time as the third light beam 3855 containing data from the first subscriber arrives at the optical router 3110.

By employing optical components to converge and re-collimate the light beams as described previously, the internal components of the optical router 3110, such as the beam deflector, advantageously operate on relatively narrow light beams. This improves the accuracy of beam redirection. Conversely, by employing optical components to expand and re-collimate the light beams as described previously, the light beams traveling through the atmosphere between network elements are advantageously relatively wide light beams. This improves the reception characteristics of the light beams as they are received by the network components.

The optical router 3110 further comprises an active optics control system 3350, such as are well known, particularly in the defense industry. The active optics control system 3350 provides stabilization of the first light beam 3140 on the optical antenna 3210 of the optical router 3110 and of the fourth light beam 3150 on the optical antenna 3710 (of FIG. 21) of the primary transceiver unit 3120. As the first light beam 3140 travels from the optical antenna 3210 toward the beam demodulator 3372, a small portion of the first light beam 3140 is split by a beam separator 3380 and redirected to a beam alignment detector 3352. The beam alignment detector 3352 detects misalignment or wander in the first light beam 3140 which may occur and stores the beam stabilization information. Atmospheric turbulence and density variations along the atmospheric path between the primary transceiver unit 3120 and the optical router 3110 may account for misalignment of the first light beam 3140 on the optical router 3110. Likewise, events such as ground shifting or tower sway may cause the positions of the primary transceiver unit 3120 or optical router 3110 relative to each other to change.

The active optics control system 3350 communicates the beam stabilization information to the electronic router 3790 which in turn communicates the beam stabilization information to the beam modulator 3364. The beam modulator 3364 modulates the beam stabilization information data onto the fourth light beam 3150 during a designated time period for atmospheric transmission to the primary transceiver unit 3120. The primary transceiver unit 3120 demodulates the beam stabilization information data from the fourth light beam 3150 and uses the beam stabilization information to make corrections and stabilize the first light beam 3140 on the optical router 3110.

Additionally, the active optics control system 3350 uses the beam misalignment information to control a beam adjuster 3220, positioned between the optical antenna 3210 and the beam splitter 3230, to adjust the first light beam 3140 optimally into the beam demodulator 3372.

As previously mentioned the primary transceiver unit 3120 communicates control information to the optical router 3110. The control information further comprises beam stabilization information. The active optics control system 3350 uses the beam stabilization information from the primary transceiver unit 3120 to control the optical antenna 3210 and beam adjuster 3220 to make corrections and stabilize the fourth light beam 3150 on the primary transceiver unit 3120.

Preferably the beam separator 3380 is a dichroic mirror. Alternatively, the first light beam 3140 and fourth light beam 3150 are orthogonally polarized and the beam separator 3380 is a polarization separator.

In the preferred embodiment of the invention, the optical router 3110 periodically polls the subscriber transceiver units 3130 by allocating a communication channel to each of the subscriber transceiver units 3130 within the range of accessibility of the optical router 3110. However, the optical router 3110 may lose reception of the third light beam 3855 from a given subscriber transceiver unit for a significant period of time. The most common cause of the reception loss is the subscriber transceiver unit being powered off. When the optical router 3110 detects reception loss, the optical router 3110 preferably and advantageously polls the powered-off subscriber less frequently than subscriber transceiver units which are actively transmitting a third light beam 3855 to the optical router 3110.

Alternate Embodiment

Figure 20:
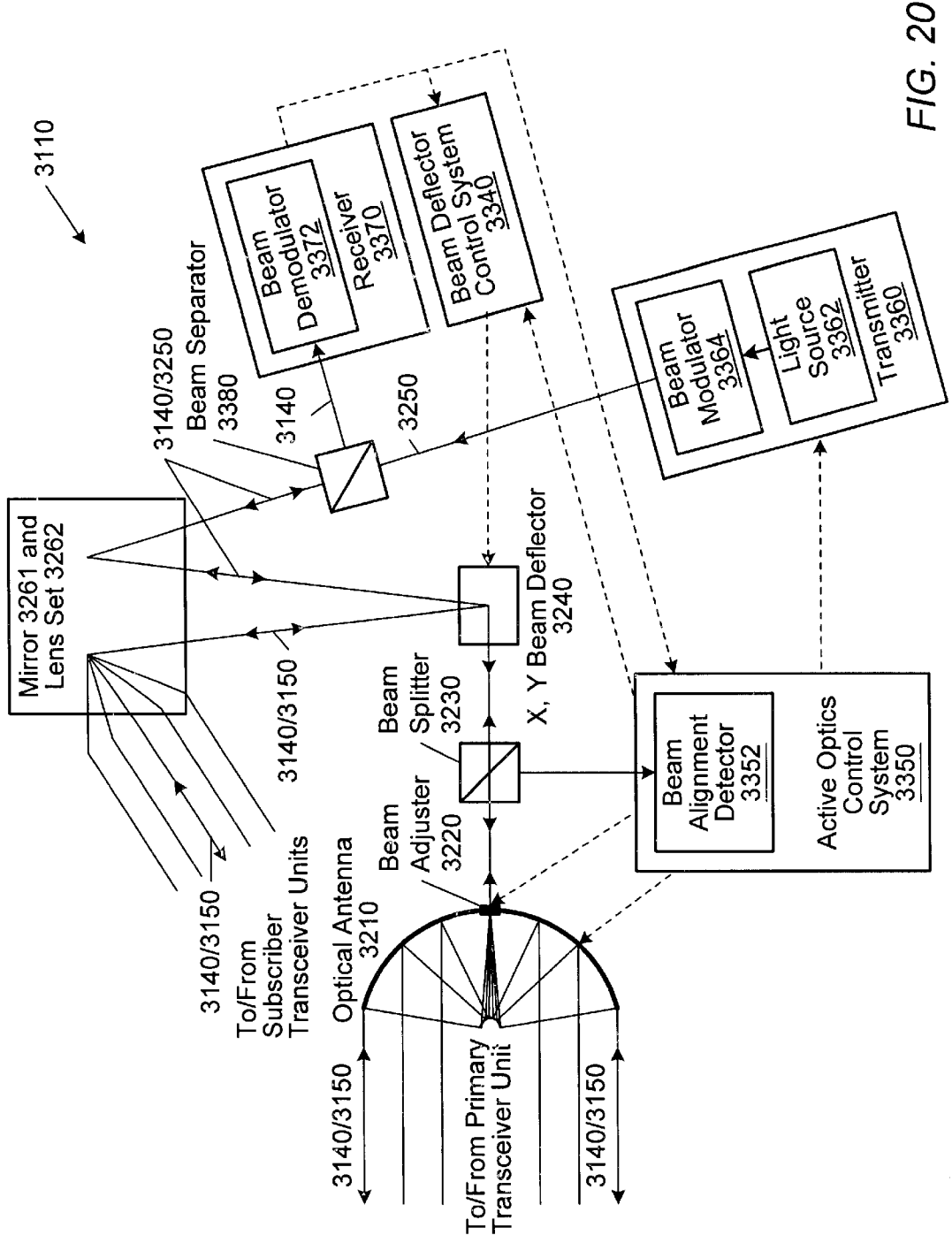
FIG. 20 illustrates the optical router in the network of FIG. 16.

Referring now to FIG. 20, an alternate embodiment of the optical router 3110 in the network 3100 (of FIG. 16) is shown. The optical router 3110 comprises an optical antenna 3210 which receives the first light beam 3140 from the primary transceiver unit 3120. The optical antenna 3210 also transmits the second light beam 3150 received from a subscriber transceiver unit to the primary transceiver unit 3120. The optical antenna 3210 preferably comprises an optical system with a conic mirror, which is well known in the art. In an alternate embodiment the optical antenna 3210 is a collecting lens system which is also well known in the art. The optical antenna 3210 and associated optics converge and re-collimate the incoming first light beam 3140 to a relatively small diameter, preferably in the range of 1 to 3 millimeters. Conversely, the optical antenna 3210 receives a relatively small diameter second light beam 3150 received from internal components of the optical router 3110 and expands and re-collimates the second light beam 3150 for atmospheric transmission to the primary transceiver unit 3120.

The optical antenna 3210 receives the first light beam 3140 from the primary transceiver unit 3120 (of FIG. 16) and directs the first light beam 3140 to an X-Y beam deflector 3240. The beam deflector 3240 receives the first light beam 3140 and deflects the first light beam 3140 toward a mirror 3261. The mirror 3261 reflects the first light beam 3140 to a respective one or more of the subscriber transceiver units 3130 (of FIG. 16). Conversely, the subscriber transceiver units 3130 transmit respective second light beams 3150 to the mirror 3261. The mirror 3261 reflects a received second light beam 3150 to the beam deflector 3240. The beam deflector 3240 deflects the second light beam 3150 to the optical antenna 3210. The optical antenna 3210 receives the second light beam 3150 and transmits the second light beam 3150 to the primary transceiver unit 3120.

Preferably, during a first time period, the beam deflector 3240 deflects the first light beam 3140 from the optical antenna 3210 to a location on the mirror 3261 and deflects the second light beam 3150 from substantially the same location on the mirror to the optical antenna 3210. The location on the mirror 3261 is calculated to reflect the first light beam 3140 to a particular subscriber transceiver unit and reflect the second light beam 3150 from the particular subscriber transceiver unit. Hence, the optical router 3110 establishes a bi-directional communications channel using the first and second light beams between the primary transceiver unit 3120 and one of the subscriber transceiver units 3130 for a period of time. During subsequent periods of time the beam deflector 3240 deflects the light beams to other locations on the mirror 3261 in order to establish channels with the other subscriber transceiver units 3130 serviced by the optical router 3110. In this manner, a wireless point-to-multipoint bi-directional wide area telecommunications network is advantageously formed.

The beam deflector 3240 is controlled by a beam deflector control system 3340 coupled to the beam deflector 3240. The beam deflector control system 3340 controls the beam deflector 3240 to deflect the light beams to the desired locations on the mirror 3261 during the desired time. Preferably, the beam deflector control system 3340 receives control information from the primary transceiver unit 3120 to control the beam deflector 3240. The control information for the optical router 3110 contains information about the angular location of the subscriber transceiver units 3130. The beam deflector control system 3340 uses the subscriber transceiver unit angular location information to determine the desired locations on the mirror 3261 used for deflection of the light beams.

As mentioned in the discussion of FIG. 16, the primary transceiver unit 3120 also preferably transmits multiplexing control information to the optical router 3110 and to the subscriber transceiver units 3130. The primary transceiver unit 3120 transmits the control information for one or more subscriber channels prior to transmitting the subscriber data packets associated with the one or more subscriber channels. Preferably, the multiplexing information is timing information used by the beam deflector control system 3340 to control the beam deflector 3240 regarding when to deflect the light beams to and from a particular location on the mirror 3261. A first subscriber transceiver unit 3130 transmits the second light beam 3150 containing data for the primary transceiver unit 3120 to the optical router 3110 at a time determined by the primary transceiver unit 3120. Correspondingly, the primary transceiver unit 3120 transmits the first light beam 3140 containing data for the first subscriber to the optical router 3110 at a time such that the first light beam 3140 containing data for the first subscriber arrives at the optical router 3110 at substantially the same time the second light beam 3150 containing data from the first subscriber arrives at the optical router 3110. Additionally, the beam deflector control system 3340 controls the beam deflector 3240 to redirect the first and second light beams between the primary transceiver unit 3120 and first subscriber transceiver unit 3130 during the time when the first and second light beams are passing through the optical router 3110, as directed by the primary transceiver unit 3120.

Preferably, the X-Y beam deflector 3240 is a galvanometer mirror pair. Galvanometer mirrors are well known, particularly in the art of laser printer technology and the art of laser light shows.

One embodiment contemplates the beam deflector 3240 comprising a plurality of such galvanometer mirror pairs. Each galvanometer mirror pair deflects a different light beam between the mirror 3261 and the optical antenna 3210.

The primary transceiver unit 3120 transmits the first light beam 3140 which is comprised of multiple light beams each of a different wavelength, i.e., the first light beam 3140 includes a plurality of different wavelengths. The optical router 3110 splits the first light beam 3140 into respective wavelength portions which are deflected by respective beam deflectors. Conversely, multiple subscriber transceiver units 3130 transmit second light beams 3150 of differing wavelengths which arrive simultaneously at the optical router 3110. The optical router 3110 combines the multiple wavelength second light beams 3150 and transmits the multiple wavelength second light beam 3150 to the primary transceiver unit 3120.

Other embodiments contemplate the beam deflector 3240 comprising one or more acousto-optic or solid state beam deflectors.

Preferably the mirror 3261 is a conical or hemispherical mirror wherein the cone axis is in a vertical orientation, thus providing 360 degree access to subscribers with an elevation aperture covering the access area to a range of approximately between 2000 and 4000 feet. The mirror 261 is circumscribed by a lens set 3262. The lens set 3262 preferably comprises a plurality of relatively small positive lenses arrayed in a conical or hemispherical fashion. As the relatively small diameter first light beam 3140 reflects from the mirror 3261, the first light beam 3140 expands in diameter. The lens set 3262 re-collimates the expanding first light beam 3140 back to a slightly converging first light beam 3140 for atmospheric transmission to the subscriber transceiver units 3130. Conversely, the lens set 3262 focuses the second light beam 3150 from the subscriber transceiver units 3130 onto the mirror 3261. An aperture is formed in the lens set 3262 through which the relatively small diameter first and second light beams travel between the X-Y beam deflector 3240 and the mirror 3261. The mirror 3261 and lens set 3262 collimate beam 3150 in a manner optimized for the optical router 3261 access area.

By employing optical components to converge and re-collimate the light beams as described previously, the internal components of the optical router 3110, such as the beam deflector, advantageously operate on relatively narrow light beams. This improves the accuracy of beam redirection. Conversely, by employing optical components to expand and re-collimate the light beams as described previously, the light beams traveling through the atmosphere between network elements are advantageously relatively wide light beams. This improves the reception characteristics of the light beams as they are received by the receivers of the network components.

The optical router 3110 further comprises a receiver 3370 and a beam separator 3380. Preferably, the optical router 3110 establishes a control channel between the primary transceiver unit 3120 and the optical router 3110 for use in communicating control information, as previously discussed, from the primary transceiver unit 3120 to the optical router 3110. The control channel is distinct from the subscriber channels. Preferably, the beam deflector control system 3340 controls the beam deflector 3240 to redirect a particular first light beam 3140 to the beam separator 3380 rather than to the subscriber transceiver units 3130. This redirection to the beam separator 3380 rather than to the subscriber units 3130 preferably occurs at preset periods of time. The beam separator 3380 redirects the particular first light beam 3140 to the receiver 3370, which receives the first light beam 3140. The primary transceiver unit 3120 correspondingly modulates the control information data on the first light beam 3140 to be received and demodulated by the beam demodulator 3372 in the receiver 3370. The receiver 3370 is coupled to the beam deflector control system 3340 and communicates the control information data to the beam deflector control system 3340. The beam demodulator 3372 preferably comprises a photo-diode as is common in the art.

Preferably, the control channel is established in a time-multiplexed manner. During a time period, which is distinct from time periods devoted to subscriber channels, the beam control system 3340 controls the beam deflector 3240 to deflect the first light beam 3140 to a location on the mirror 3261 such that the first light beam 3140 is reflected to the beam separator 3380 rather than to the subscriber transceiver units 3130. The primary transceiver unit 3120 instructs the optical router 3110 to establish this control channel prior to the time for the optical router 3110 to establish the control channel. Preferably, during initialization, the optical router 3110 devotes all communication channels to be control channels until instructed by the primary transceiver unit 3120 to allocate subscriber channels.

In an alternate embodiment, the control channel is established in a frequency-multiplexed manner wherein a light beam of a distinct frequency, which is distinct from frequencies devoted to subscriber channels, is devoted to control channels.

The optical router 3110 further comprises an active optics control system 3350, such as are well known, particularly in the defense industry. The active optics control system 3350 provides stabilization of the first light beam 3140 on the optical antenna 3210 of the optical router 3110 and the second light beam 3150 on the optical antenna 3710 (of FIG. 21) of the primary transceiver unit 3120. As the first light beam 3140 travels from the optical antenna 3210 to the beam deflector 3240, a small portion of the first light beam 3140 is split by a beam splitter 3230 and redirected to a beam alignment detector 3352. The beam alignment detector 3352 detects misalignment or wander in the first light beam 3140 which may occur and stores the beam stabilization information. Atmospheric turbulence and density variations along the atmospheric path between the primary transceiver unit 3120 and the optical 3110 may account for misalignment of the first light beam 3140 on the optical router 3110. Likewise, events such as ground shifting or tower sway may cause the positions of the primary transceiver unit 3120 or optical router 3110 relative to each other to change.

The active optics control system 3350 communicates the beam stabilization information to the primary transceiver unit 3120 on a control channel. The primary transceiver unit 3120 uses the beam stabilization information to make corrections and stabilize the first light beam 3140 on the optical router 3110.

The optical router 3110 further comprises a transmitter 3360 including a light source 3362 and a beam modulator 3364. The active optics control system 3350 provides the beam stabilization information of the first light beam 3140 to the transmitter 3360. The light source 3362 generates and atmospherically transmits a control light beam 3250. The beam modulator 3364 modulates the positional information on the control light beam 3250 as it travels through the beam separator 3380 to the mirror 3261. Thus a control channel is established between the optical router 3110 and the primary transceiver unit 3120, similar to the control channel described above in which the primary transceiver unit 3120 transmits control information to the optical router 3110, but in the opposite direction. That is, while the beam deflector 3240 is controlled to deflect the first light beam 3140 to the mirror 3261 such that the mirror 3261 reflects the first light beam 3140 to the receiver 3370, the beam deflector 3240 also deflects the control light beam 3250 from the mirror 3261 to the optical antenna 3210. This provides a two-way or bi-directional control channel.

The optical router 3110 light source 3362 preferably comprises one or more continuous wave or pulsed beam lasers as are well known in the art, such as gas, solid state or diode lasers. The beam modulator 3364 preferably comprises an electro-optic cell. Alternatively, the beam modulator 3364 is a bulk type modulator. The light source and beam modulator configuration is indicative of those well known in fiber optic communication link transmission systems. However, the laser power output is typically significantly greater than those used in fiber optic systems.

Additionally, the active optics control system 3350 uses the beam misalignment information to control the beam adjuster 3220 to adjust the first light beam 3140 optimally into the beam deflector 3240.

As previously mentioned the primary transceiver unit 3120 communicates control information to the optical router 3110. The control information further comprises beam stabilization information which the optical router 3110 receives on the control channels. The active optics control system 3350 of the optical router 3110 uses the beam stabilization information from the primary transceiver unit 3120 to control the optical antenna 3210 and beam adjuster 3220 to make corrections and stabilize the second light beam 3150 on the primary transceiver unit 3120.

In an alternate embodiment, the optical router active optics control system 3350 further comprises a second beam alignment detector (not shown) which detects misalignment or wander in the second light beam 3150 from the subscriber transceiver units 3130 and stores the beam stabilization information. The optical router 3110 communicates the beam stabilization information to the primary transceiver unit 3120. The primary transceiver unit 3120 in turn communicates the beam stabilization information to the subscriber transceiver units 3130. The active optics control systems in the subscriber transceiver units 3130, discussed below, use the beam stabilization information from the primary transceiver unit 3120 to control the subscriber transceiver unit optical antennas and beam adjusters to make corrections for misalignment or wander and stabilize the second light beam 3150 on the optical router 3110.

In one embodiment the beam separator 3380 is a dichroic mirror. In another embodiment, the first light beam 3140 and second light beam 3150 are orthogonally polarized and the beam separator 3380 is a polarization separator.

Preferably, the optical router 3110 periodically polls the subscriber transceiver units 3130 by allocating a communication channel to each of the subscriber transceiver units 3130 within the range of accessibility of the optical router 3110. However, the optical router 3110 may lose reception of the second light beam 3150 from a given subscriber transceiver unit for a significant period of time. The most common cause of the reception loss is the subscriber transceiver unit being powered off. When the optical router 3110 detects reception loss, the optical router 3110 preferably and advantageously polls the powered-off subscriber less frequently than subscriber transceiver units which are actively transmitting a second light beam 3150 to the optical router 3110.

The Primary Transceiver Unit

Figure 21:
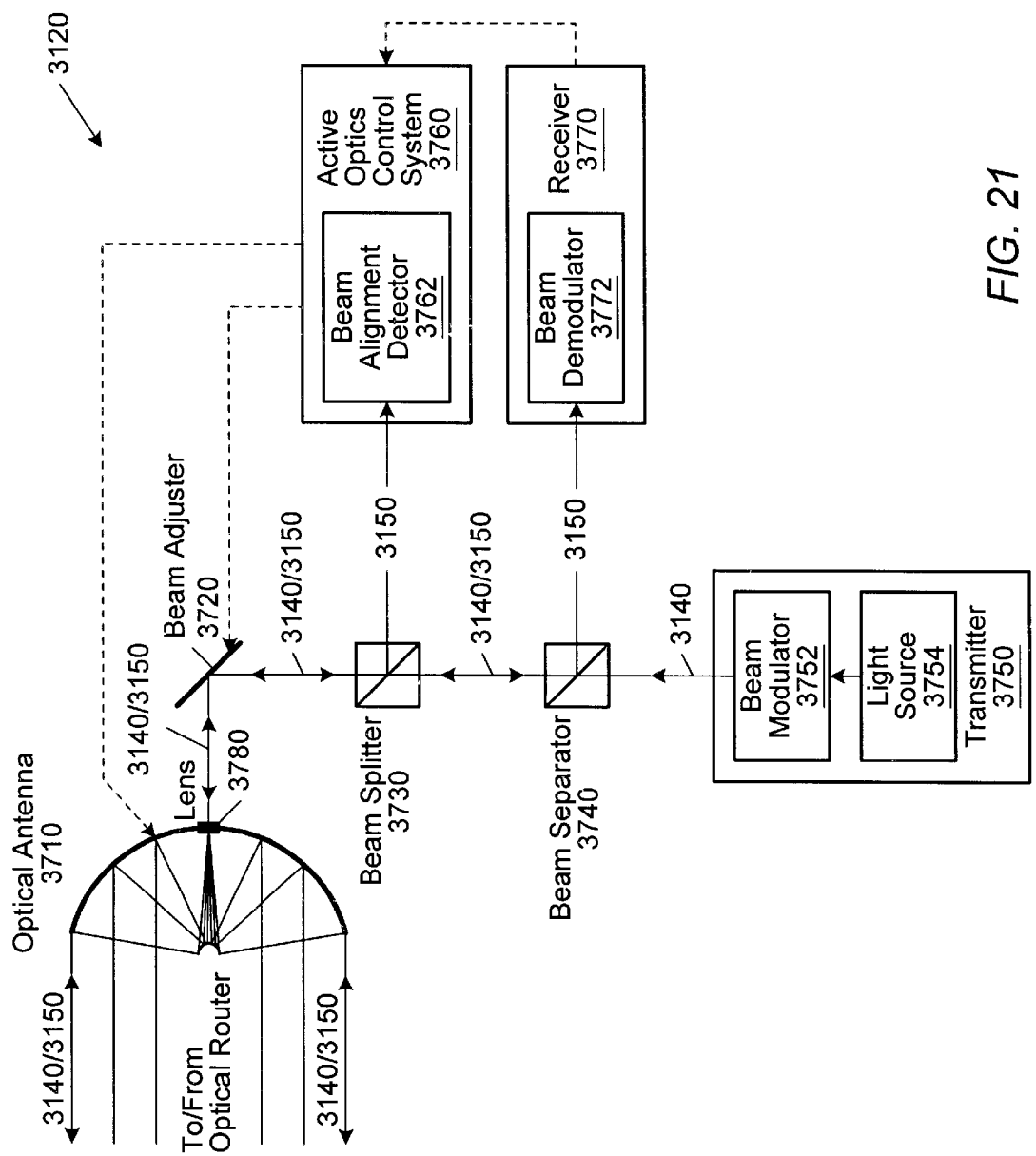
FIG. 21 illustrates the primary transceiver unit of FIGS. 14 and 16.

Referring now to FIG. 21, the preferred embodiment of the primary transceiver unit 3120 in the network 3100 (of FIG. 14) is shown. The primary transceiver unit 3120 comprises an optical antenna 3710 optically coupled to a transmitter 3750 and a receiver 3770.

The optical antenna 3710 transmits the first light beam 3140 to the optical router 3110 (of FIG. 14) and receives the fourth light beam 3150 from the optical router 3110. (It is noted that for the network 3100 where the alternate embodiment of the optical router 3110 is employed, i.e., the network of FIG. 16, the optical antenna 3710 receives the second light beam 3150.) The optical antenna 3710 preferably is similar to the optical antenna 3210 of the optical router 3110. An optical antenna 3710 of the primary transceiver unit 3120 is contemplated with different dimensions and optical characteristics than the optical antenna 3210 of the optical router 3110.

The optical antenna 3710 of the primary transceiver unit 3120 is preferably larger than the subscriber transceiver unit optical antenna. Preferably, the receiver 3770 of the primary transceiver unit 3120 is more sensitive, i.e., able to demodulate a weaker light beam, than that of the subscriber transceiver units. Thus the subscriber transceiver unit light source, discussed below, may be less powerful, thus reducing the cost of the subscriber transceiver units. In other words, the primary transceiver unit 3120 transmitter light source 3754 is preferably more powerful than the subscriber transceiver unit light source. This allows the subscriber transceiver unit antenna, discussed below, to be relatively small and the subscriber transceiver unit receiver, discussed below, to be relatively less sensitive. Hence the total cost of the system is reduced since the number of subscriber transceiver units is typically much greater than the number of primary transceiver units in the network.

A data source/sink (not shown) provides data to the primary transceiver unit 3120 to be sent to the subscriber transceiver units 3130. The data source/sink ties into and/or uses existing communication structures such as a telephone network, cable television system, the Internet or other networks employing Asynchronous Transfer Mode (ATM), switched-ethernet, SONNET, FDDI, Fibre-Channel, Serial Digital Heirarchy, etc. Various means for coupling the data source/sink to the primary transceiver unit 3120 are contemplated, such as fiber-optic cable, satellite up-links and down-links, atmospheric light beams, coaxial cable, microwave links, etc. The light source 3754 generates and atmos-pherically transmits the first light beam 3140 upon which the beam modulator 3752 modulates the data to be sent to the subscriber transceiver units 3130. A beam adjuster 3720, which preferably comprises an adjustable fine steering mirror, receives and reflects the first light beam 3140 to a lens assembly 3780 and optical antenna 3710 which expand, re-collimate and transmit the first light beam 3140 to the optical router 3110.

Conversely, the primary transceiver unit optical antenna 3710 atmospherically receives the fourth light beam 3150 from the optical router 3110, and the lens assembly 3780 focuses the fourth light beam 3150 onto the beam adjuster 3720. The beam adjuster 3720 reflects the narrowed fourth light beam 3150 to a beam separator 3740. The beam separator 3740 is similar to that of the optical router 3110. The beam separator 3740 redirects the fourth light beam 3150 to the receiver 3770. The beam demodulator 3772 receives the fourth light beam 3150 and demodulates the data sent by the subscriber transceiver units 3130. The data is then provided to the data source/sink. The beam demodulator 3772 preferably comprises a photo-diode, as is common in the art.

The primary transceiver unit light source 3754 preferably comprises one or more continuous wave or pulsed beam lasers as are well known in the art, such as gas, solid state or diode lasers. The beam modulator 3752 preferably comprises an electro-optic cell. Alternatively, the beam modulator 3752 is a bulk type modulator. The light source and beam modulator configuration is similar to those well known in fiber optic communication link transmission systems. However, the laser power output is typically significantly greater than those used in fiber optic systems.

The light beam wavelengths generated by the atmospherically transmitting light sources described in the present invention are chosen to minimize the power loss through the atmosphere. Preferably the wavelengths are in the near infrared range.

The lens assembly 3780 and optical antenna 3710 are configured to transmit the first light beam 3140 having a beam waist which is advantageously located at the optical router 3110. The diameter of the first light beam 3140 leaving the optical antenna 3710 is many times the diameter of the first light beam 3140 exiting the light source 3754. Thus the laser power density is spread over a relatively large, cross-sectional area, which enhances eye-safety. Additionally, the relatively large diameter of the light beams traveling between the components of the network improves the reception characteristics of the light beams at the optical receivers.

The primary transceiver unit 3120 additionally comprises a control system (not shown) which computes the previously discussed routing, beam stabilization, timing, subscriber location and multiplexing control information.

The primary transceiver unit 3120 further comprises an active optics control system 3760 similar to the active optics control system 3350 of the optical router 3110. The primary transceiver unit active optics control system 3760 cooperates with the optical router active optics control system 3350 to provide stabilization of the first light beam 3140 on the optical antenna 3210 of the optical router 3110 and the fourth light beam 3150 on the optical antenna 3710 of the primary transceiver unit 3120.

As previously mentioned, the optical router 3110 communicates beam stabilization information to the primary transceiver unit 3120. The active optics control system 3760 uses the beam stabilization information from the optical router 3110 to control the optical antenna 3710 and beam adjuster 3720 to make corrections and stabilize the first light beam 3140 on the optical router 3110.

Additionally, the active optics control system 3760 uses the beam misalignment information detected by the beam alignment detector 3762 to control the beam adjuster 3720 to adjust the fourth light beam 3150 optimally into the receiver 3770.

The Subscriber Transceiver Units

Figure 22:
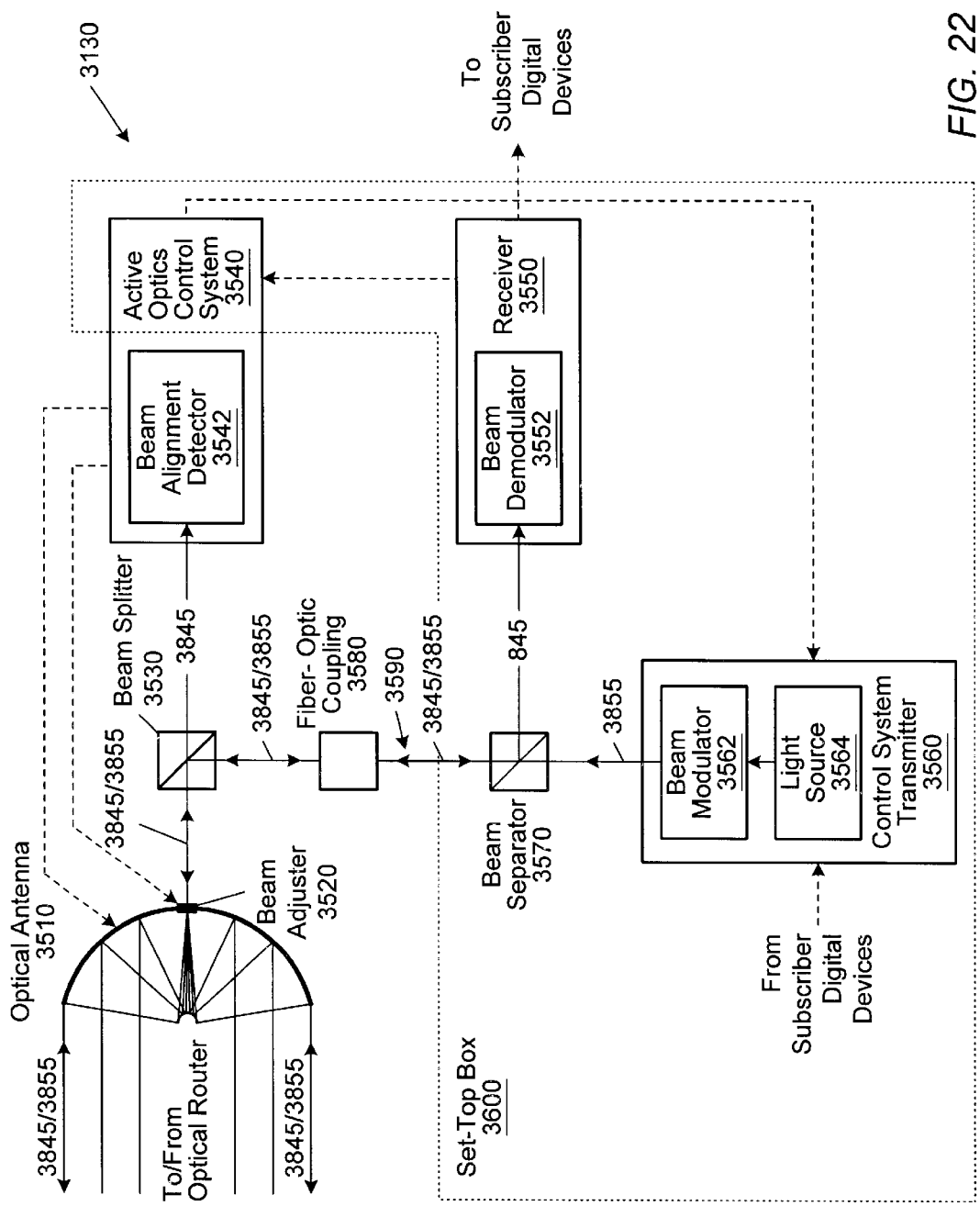
FIG. 22 illustrates a subscriber transceiver unit of FIGS. 14 and 16.

Referring now to FIG. 22, an illustration of the preferred embodiment of a subscriber transceiver unit 3130A in the network 3100 (of FIG. 14) is shown. Subscriber transceiver unit 3130A is representative of the plurality of subscriber transceiver units 3130. The subscriber transceiver unit 3130A comprises an optical antenna 3510 coupled to an input/output device 3600, such as a set-top box 3600, by a fiber optic cable 3590. The input/output device 3600 may be any of various devices, including a set-top box, computer system, television, radio, teleconferencing equipment, telephone or others which may be coupled to the optical antenna 3510 by a fiber optic cable 3590. In the remainder of this disclosure, the input/output device 3600 is referred to as a set top box. Power and control wires (not shown) also couple the subscriber optical antenna 3510 and the set-top box 3600.

The optical antenna 3510 receives the second light beam 3845 from the optical router 3110 (of FIG. 14) and transmits the third light beam 3855 to the optical router 3110. (It is noted that for the network 3100 where the alternate embodiment of the optical router 3110 is employed, i.e., the network of FIG. 16, the subscriber transceiver unit 3130A receives the first light beam 3140 from the optical router 3110 and transmits the second light beam 3150 to the optical router 3110.) The optical antenna 3510 preferably is similar to the optical antenna 3210 of the optical router 3110. An optical antenna 3510 of the subscriber transceiver unit 3130A is contemplated with different dimensions and optical characteristics than the optical antenna 3210 of the optical router 3110.

The optical antenna 3510 receives the second light beam 3845 and focuses the second light beam 3845 into a fiber-optic coupling 3580. The fiber-optic coupling 3580 couples the second light beam 3845 into the fiber optic cable 3590. The fiber optic cable 3590 carries the second light beam 3845 to the set-top box 3600. A beam separator 3570 in the set-top box 3600 redirects the second light beam 3845 to a receiver 3550 which receives the second light beam 3845. A beam demodulator 3552 in the receiver 3550 demodulates the data from the second light beam 3845. The receiver 3550 provides the data to external connections (not shown) on the set-top box 3600, which connect to various devices such as televisions, computers, radios, teleconferencing equipment and telephones (also not shown). The beam demodulator 3552 preferably comprises a photo-diode as is common in the art.

Conversely, the various digital devices provide data to be sent to the primary transceiver unit 3120 (of FIG. 14) to a transmitter 3560 in the set-top box 3600. The set-top box 3600 comprises a light source 3564 which generates the third light beam 3855. A beam modulator 3562 in the transmitter 3560 modulates the data to be sent to the primary transceiver unit 3120 on the third light beam 3855. The third light beam 3855 passes through the fiber optic cable 3590 to the fiber-optic coupling 3580. The fiber optic coupling 3580 decouples the third light beam 3855 from the fiber optic cable 3590 and atmospherically redirects the third light beam 3855 to the optical antenna 3510. The optical antenna 3510 then transmits the third light beam 3855 including the data to the optical router 3110.

The subscriber transceiver unit 3130A light source 3564 preferably comprises one or more continuous wave or pulsed beam lasers as are well known in the art, such as gas, solid state or diode lasers. The beam modulator 3562 preferably comprises an electrooptic cell. Alternatively, the beam modulator 3562 is a bulk type modulator. The light source and beam modulator configuration is similar to those well known in fiber optic communication link transmission systems. However, the laser power output is typically greater than those used in fiber optic systems.

In an alternate embodiment, previously mentioned, the subscriber transceiver unit 3130A is configured to transmit and receive multiple wavelength light beams in order to increase the data bandwidth available to a given subscriber.

The subscriber transceiver unit 3130A further comprises an active optics control system 3540 similar to the active optics control system of the optical router 3110 and the primary transceiver unit 3120. The subscriber transceiver unit active optics control system 3540 cooperates with the primary transceiver unit 3120 active optics control system to provide stabilization of the second light beam 3845 on the subscriber transceiver unit 3130A and the third light beam 3855 on the optical router 3110.

A beam alignment detector 3542 detects misalignment or wander in the second light beam 3845 from the optical router 3110 and stores the beam stabilization information. The subscriber transceiver unit 3130A communicates the beam stabilization information regarding the first light beam 3150 to the primary transceiver unit 3120 via the transmitter 3560. The invention contemplates the beam stabilization information being communicated to the primary transceiver unit 3120 in a header in a subscriber data packet. The invention additionally contemplates the beam stabilization information being communicated to the primary transceiver unit 3120 via a dedicated control data packet. The primary transceiver unit 3120 utilizes the beam stabilization information when computing positional and multiplexing control information.

A beam adjuster 3520 optically positioned between the optical antenna 3510 and the fiber optic coupling 3580 is controlled by the active optics control system 3540 to maintain efficient coupling of the second light beam 3845 into the fiber optic cable 3590.

The optical antenna 3510 is mounted on gimbals (not shown) which allow the optical antenna 3510 to rotate and search for an optical router 3110, or different transceiver module 3800 of the preferred optical router 3110, by which to receive service upon installation or upon loss of reception from a current optical router 3110 or transceiver module 3800.

Alternate Embodiments

An alternate embodiment of the subscriber transceiver unit 3130A is contemplated in which the light beams are converted to/from electrical signals at the optical antenna 3510 and transmitted in electronic form to the input/output device 3600. Hence, alternative transmission mediums for coupling the optical antenna 3510 to the input/output device 3600 are contemplated such as coaxial cable or other forms of electrical wires.

Figure 23:
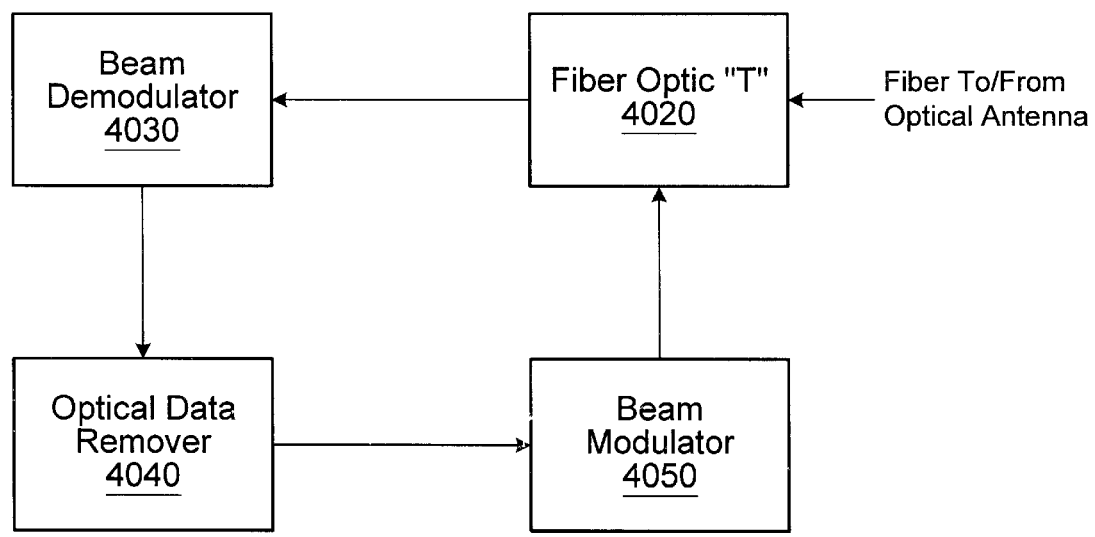
FIG. 23 is a block diagram of a portion of an alternate embodiment of the subscriber transceiver unit of FIG. 22.

Referring now to FIG. 23, an alternate embodiment of the set-top box 3600 of FIG. 9 is shown. A fiber optic "T" 4020 is coupled to the fiber optic cable 3590. The second light beam 3845 enters the fiber optic "T" 4020 and passes along the fiber optic cable 3590 to a beam demodulator 4030. The beam demodulator 4030 is similar to and performs similar functions to the beam demodulator 3552 of the preferred embodiment. The second light beam 3845 then passes through the fiber optic cable 3590 to an optical data remover 4040. The optical data remover 4040 preferably comprises a micro-bender. The data remover 4040 removes any data which has been modulated on the second light beam 3845. At this point the second light beam 3845 essentially becomes the third light beam 3855. The third light beam 3855 is then passed along the fiber optic cable 3590 to a beam modulator 4050. The beam modulator 4050 is similar to and performs similar functions to the beam modulator 3562 of the preferred embodiment of the subscriber transceiver unit 3130A. The third light beam 3855 including the second data is then passed to the fiber optic "T" 4020 and on to the fiber optic coupling for transmission to the optical router 3110. The alternate embodiment advantageously avoids the cost of a light source.

An alternate embodiment of the subscriber transceiver unit 3130A optical antenna is contemplated in which the antenna is an omni-directional antenna. The omni-directional antenna is similar to the mirror and lens set assembly of the alternate embodiment of the optical router 3110. Additionally, a beam deflector is provided for coupling and decoupling the light beams into and out of the fiber optic coupling 3580. Alternatively, the fiber optic coupling 3580 is rotatably mounted. The alternate embodiment advantageously enables the subscriber unit 3130 to receive service from an alternate optical router 3110 with minimal interruption of data transmission. In addition, installation of the subscriber transceiver unit 3130 is simplified in that virtually no alignment must be performed upon installation, other than achieving a line of sight path to one or more optical routers 3110.

The present invention contemplates the use of fiber optic amplifiers, such as an EDFA (erbium-doped fiber amplifier), in one or more of the various network elements for amplifying the various light beams in order to achieve appropriate signal power levels of the various light beams within the network.

The present invention contemplates the use of atomic line filters, which act as optical band-pass filters for selected light wavelengths, in one or more of the various network element receivers for filtering out necessary light wavelengths, such as sunlight.

The present invention contemplates the use of light sources in the various network element transmitters with adjustable light beam power control. The light beam power is adjusted according to factors such as weather conditions to achieve a proper fade margin for the signal power. A fade margin of 15 dB at a 1 km range to achieve a $10^{-9}$ bit error rate is preferred.

Conclusion

Therefore, the present invention comprises a wireless point-to-multipoint wide area telecommunications network by establishing subscriber communications channels in a multiplexed manner using atmospherically transmitted light beams. The network employs an optical router to establish the communications channels between a primary transceiver unit and a plurality of subscriber transceiver units by time-multiplexing, light beam frequency multiplexing, or a combination thereof, the atmospherically transmitted light beams.

Although the systems and networks of the present invention have been described in connection with several preferred embodiments, the present invention is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A system for light-based wireless communication through the atmosphere, comprising:
   an optical fiber;
   a passive optical antenna coupled to the optical fiber, wherein the passive optical antenna is configured (a) to decouple a first light beam from the optical fiber and transmit the first light beam into the atmosphere, and (b) to receive a second light beam from the atmosphere and couple the second light beam onto the optical fiber;
   a transceiver unit coupled to the optical fiber, wherein the transceiver unit includes:
      a transmitter for generating the first light beam and modulating a first data signal onto the first light beam;
      a receiver for demodulating a second data signal from the second light beam;
      a coupling interface for coupling the modulated first light beam onto the optical fiber, and for decoupling the second light beam from the optical fiber and providing the second light beam to the receiver;
      a data interface configured to couple to a communication bus, wherein the data interface is configured to receive the first data signal from the communication bus and provide the first data signal to the transmitter, and further configured to receive the second data signal from the receiver and transmit the second data signal onto the communication bus.

2. A system for wireless light-based transmission of information, comprising:

an optical fiber;

a passive optical antenna coupled to the optical fiber, wherein the passive optical antenna is configured to decouple a first light beam from the optical fiber and transmit the first light beam into the atmosphere;

a transmitter unit coupled to the optical fiber, wherein the transmitter unit includes:
  a transmitter subsystem for generating the first light beam and modulating a first data signal onto the first light beam;
  a coupling unit for coupling the modulated first light beam onto the optical fiber;
  a data interface configured to couple to a communication bus, wherein the data interface is configured to receive the first data signal from the communication bus and provide the first data signal to the transmitter.

3. A system for receiving atmospheric light-beam transmissions, comprising:

an optical fiber;

a passive optical antenna coupled to the optical fiber, wherein the passive optical antenna is configured to receive a first light beam from the atmosphere and couple the first light beam onto the optical fiber;

a receiver unit coupled to the optical fiber, wherein the receiver unit includes:
  a receiver subsystem for demodulating a first data signal from the first light beam;
  a coupling interface for decoupling the first light beam from the optical fiber and providing the first light beam to the receiver subsystem;
  a data interface configured to couple to a communication bus, wherein the data interface is configured to receive the first data signal from the receiver subsystem and transmit the first data signal onto the communication-bus.

4. A system for wireless light-based communication through the atmosphere, comprising:

a first optical fiber and a second optical fiber;

a first passive optical antenna coupled to the first optical fiber, wherein the first passive optical antenna is configured to decouple a first light beam from the first optical fiber and transmit the first light beam into the atmosphere;

a second passive optical antenna coupled to the second optical fiber, wherein the second passive optical antenna is configured to receive a second light beam from the atmosphere and couple the second light beam onto the second optical fiber;

a transceiver unit coupled to the first optical fiber and the second optical fiber, wherein the transceiver unit includes:
  a transmitter for generating the first light beam and modulating a first data signal onto the first light beam;
  a receiver for demodulating a second data signal from the second light beam;
  a fiber coupler for coupling the modulated first light beam supplied by the transmitter onto the first optical fiber;
  a fiber decoupler for decoupling the second light beam from the second optical fiber and providing the second light beam to the receiver;
  a data interface configured to couple to a communication bus, wherein the data interface is configured to receive the first data signal from the communication bus and provide the first data signal to the transmitter, and further configured to receive the second data signal from the receiver and transmit the second data signal onto the communication bus.

5. A system for receiving light-beam transmissions from the atmosphere, comprising:

a plurality of optical fibers;

a corresponding plurality of passive optical antennas, wherein each of the passive optical antennas is coupled to a corresponding one of the optical fibers, wherein each of the passive optical antennas receives a portion of a first light beam from the atmosphere and couples the received portion of the first light onto the corresponding optical fiber;

an active electronics unit which includes:
  a fiber coupling unit coupled to the plurality of optical fibers, and configured to combine the multiple portions of the first light beam provided by the plurality of optical fibers;
  a receiver coupled to receive the combined portions of the first light beam from the fiber coupling unit and configured to demodulate a first data signal from the combined portions of the first light beam;
  a data interface configured to couple to a communication bus, wherein the data interface is configured to receive the first data signal from the receiver and transmit the second data signal onto the communication bus.

6. A network for wireless information broadcast based on light-beam transmission, comprising:

a transmission system which transmits a first light beam into the atmosphere, wherein the first light beam carries via modulation a first data signal;

a plurality of receivers, wherein each of the receivers includes:
  an optical fiber;
  a passive optical antenna coupled to the optical fiber, wherein the passive optical antenna is configured to receive a portion of the first light beam and couple said portion of the first light beam onto the optical fiber;
  an active electronics unit which includes:
    a receiver for demodulating the first data signal from said portion of the first light beam;
    a fiber decoupler for decoupling said portion of the first light beam from the optical fiber and providing said portion of the first light beam to the receiver;
  wherein said active electronics unit is configured to provide the first data signal to a corresponding digital device.

7. The network of claim 6, wherein the transmission system comprises:

a transmit optical fiber;

a transmit optical antenna coupled to the transmit optical fiber;

a transmitter unit coupled to the transmit optical fiber and configured to modulate the first data signal onto the first light beam and to couple the modulated first light beam onto the transmit optical fiber;

wherein the transmit optical antenna is configured to decouple the first light beam from the transmit optical fiber and transmit the first light beam into the atmosphere.

8. The network of claim 7, wherein the transmitter unit is situated at a first location internal to a first building, wherein the transmit optical antenna is situated at a second location external to the first building.

9. The network of claim 6, wherein a first passive optical antenna corresponding to a first of said receivers is situated at a third location external to a second building, wherein a first active electronics unit corresponding to the first receiver is situated at a fourth location internal to the second building.

10. A system for light-beam transmission of multiple independent data streams to multiple destinations, comprising:
   a laser for generating a first laser beam;
   an active electronics unit configured to receive the first laser beam, wherein the active electronics unit includes:
      a beam spitting device for splitting the first laser beam into a plurality of beam components;
      a plurality of modulators for modulating a corresponding plurality of data signals on the plurality of beam components, wherein each of the modulators modulates a corresponding one of the data signals on a corresponding one of the beam components;
      a coupling device for coupling the modulated beam components onto a corresponding plurality of optical fibers, wherein each of the modulated beam components is coupled onto a corresponding one of the optical fibers;
      a data interface configured to couple to a communication bus, wherein the data interface is configured to receive a data stream from the communication bus, and further configured to supply the corresponding data signals to the plurality of modulators;
   a plurality of passive optical antennas, wherein each of the passive optical antennas is coupled to a corresponding one of the optical fibers, wherein each of the passive optical antennas decouples the modulated beam component from the corresponding optical fiber, and transmits the modulated beam component into the atmosphere.

11. A system for wireless light-beam transmission of information to multiple destinations, comprising:
   a laser for generating a first laser beam;
   a plurality of optical fibers;
   an active electronics unit coupled to the plurality of optical fibers and configured to receive the first laser beam, wherein the active electronics unit includes:
      a modulator for modulating a first data signal onto the first laser beam;
      a power splitting unit for splitting the modulated first laser beam into a plurality of beam components;
      a fiber coupler for coupling each of the beam components onto a corresponding one of the optical fibers;
      a data interface configured to couple to a communication bus, wherein the data interface is configured to receive the first data signal from the communication bus and supply the first data signal to the modulator;
   a plurality of optical antenna, wherein each of the optical antennas is coupled to a corresponding one of the optical fibers, wherein each of the optical antennas is configured decouple a corresponding beam component from the corresponding optical fiber and transmit the corresponding beam component into the atmosphere.

12. A switching system for establishing wireless interconnectivty for a number of subscribers based on the atmospheric transmission of light beams, comprising:
   a plurality of optical fibers;
   a corresponding plurality of passive optical antennas, wherein each of the passive optical antennas is coupled to a corresponding one of the optical fibers, wherein each of the passive optical antennas is configured (a) to receive a first light beam from the atmosphere and couple the first light beam onto the corresponding optical fiber, and (b) to decouple a second light beam from the corresponding optical fiber and transmit the second light beam into the atmophere;
   a plurality of transceivers, wherein each of the transceivers is coupled to a corresponding one of the optical fibers, wherein each of the transceivers is configured (a) to receive the first light beam from the corresponding optical fiber, (b) to demodulate a first data signal from the first light beam, (c) to generate the second light beam, (d) to modulate a second data signal onto the second light beam, and (e) to couple the second light beam onto the corresponding optical fiber;
   an electronic switching system for exchanging data signal between the transceivers, wherein the electronic switching system is configured to transmit the second data signal generated by a first transceiver to a second transceiver, and further configured to transmit the second data signal generated by the second transciever to the first transceiver.

13. A method for providing an optical communication capacity to a building, the method comprising:
   mounting a passive optical antenna at a first location external to the building;
   situating an active electronics unit at a second location internal to the building, wherein said second location is equipped with a power outlet;
   coupling the active electronics unit to the power outlet;
   coupling the passive optical antenna at the first location and the active electronics unit at the second location with an optical fiber;
   coupling a digital device to the active electronics unit through a communication bus;
   the passive optical antenna receiving a light beam containing digital data from the atmosphere and coupling the light beam onto the optical fiber;
   the optical fiber transferring the light beam between the passive optical antenna and the active electronics unit;
   transferring said digital data between the active electronics module and the digital device through the communication bus.

14. The method of claim 13, wherein the passive optical antenna is mounted at a first location external to a building.

15. The method of claim 14, wherein the transceiver unit is situated at a second location internal to the building.

16. A method for providing an optical communication capacity to a building, the method comprising:
   mounting a passive optical antenna at a first location external to the building;
   situating an active electronics unit at a second location internal to the building, wherein said second location is equipped with a power outlet;
   coupling the active electronics unit to the power outlet;

coupling the passive optical antenna at the first location and the active electronics unit at the second location with an optical fiber;

coupling a digital device to the active electronics unit through a communication bus;

transferring digital data between the digital device and the active electronics module through the communication bus;

the optical fiber transferring a light beam containing the digital data between the active electronics unit and the passive optical antenna;

the passive optical antenna transferring the light beam between the optical fiber and the atmosphere.

17. The method of claim 16, wherein the passive optical antenna is mounted at a first location external to a building.

18. The method of claim 17, wherein the transceiver unit is situated at a second location internal to the building.

19. A system for light-based communication comprising:

one or more optical fibers;

one or more passive optical antennas each coupled to a corresponding one of the optical fibers;

a transmitter subsystem for modulating one or more data signals onto one or more light beams;

a coupling unit for coupling the one or more modulated light beams onto the one or more optical fibers;

a data interface configured to couple to a communication bus, wherein the data interface is configured to redeive the one or more data signals from the communication bus and provide the one or more data signals to the transmitter subsystem;

wherein the one or more passive optical antennas are configured to decouple the one or more modulated light beams from the one or moree optical antennas and transmit the one or more modulated light beams into the atmosphere.

20. The system of claim 19, wherein the transmitter subsystem, coupling unit and data interface are contained in a single package, wherein the single package is situated at a first location internal to a first building, wherein the one or more passive optical antennas are situated at one or more second locations external to the first building.

21. The system of claim 19, wherein the transmitter subsystem, coupling unit and data interface are contained in a single package, wherein the single package is configured for coupling to a host computer through the communication bus.

22. A system for light-based communication comprising:

one or more optical fibers;

one or more passive optical antennas for receiving one or more light beams from the atmosphere, wherein each of the one or more passive optical antennas is coupled to a corresponding one of the optical fibers;

a receiver subsystem;

a coupling interface for decoupling the one or more light beams from the one or more optical fibers and providing the one or more light beams to the receiver subsystem, wherein the receiver subsystem is configured to demodulate one or more data signals from the one or more light beams;

a data interface configured to couple to a communication bus, wherein the data interface is configured to receive the one or more data signals from the receiver subsystem and transmit the one or more data signals onto the communication bus.

23. The system of claim 22, wherein the receiver subsystem, coupling interface and data interface are contained in a single package, wherein the single package is situated at a first location internal to a first building, wherein the one or more passive optical antennas are situated at one or more second locations external to the first building.

24. The system of claim 22, wherein the receiver subsystem, coupling interface and data interface are contained in a single package, wherein the single package is configured for coupling to a host computer through the communication bus.

* * * * *

UNITED STATES PATENT AND TRADEMARK OFFICE
CERTIFICATE OF CORRECTION

PATENT NO. : 6,348,986
DATED : February 19, 2002
INVENTOR(S) : Mark A. Doucet and David L. Panak It is certified that error appears in the above-identified patent and that said Letters Patent is hereby corrected as shown below:

Column 41,
Line 29, please delete "redeive" and substitute -- receive --.
Line 35, please delete "moree" and substitute -- more --.

Signed and Sealed this

Twenty-first Day of May, 2002

Attest:

Attesting Officer

JAMES E. ROGAN
*Director of the United States Patent and Trademark Office*